US 10,031,815 B2

(12) United States Patent
Cohen et al.

(10) Patent No.: US 10,031,815 B2
(45) Date of Patent: Jul. 24, 2018

(54) TRACKING HEALTH STATUS IN SOFTWARE COMPONENTS

(71) Applicant: CA, Inc., New York, NY (US)

(72) Inventors: Corey Cohen, Matawan, NJ (US); Erhan Giral, Daly City, CA (US); Andreas Reiss, Frankfurt (DE); Zaneta Svozilova, Prague (CZ)

(73) Assignee: CA, Inc., New York, NY (US)

( * ) Notice: Subject to any disclaimer, the term of this patent is extended or adjusted under 35 U.S.C. 154(b) by 137 days.

(21) Appl. No.: 14/753,943

(22) Filed: Jun. 29, 2015

(65) Prior Publication Data
US 2016/0378615 A1 Dec. 29, 2016

(51) Int. Cl.
G06F 11/14 (2006.01)
G06F 11/30 (2006.01)
G06F 11/07 (2006.01)
G06F 11/34 (2006.01)

(52) U.S. Cl.
CPC ........ G06F 11/1469 (2013.01); G06F 11/079 (2013.01); G06F 11/0793 (2013.01); G06F 11/302 (2013.01); G06F 11/3051 (2013.01); G06F 11/3079 (2013.01); G06F 11/3466 (2013.01); G06F 2201/805 (2013.01); G06F 2201/85 (2013.01)

(58) Field of Classification Search
CPC .............. G06F 11/1469; G06F 11/302; G06F 11/3466; G06F 11/079; G06F 11/0793; G06F 11/3051; G06F 11/3079; G06F 2201/805; G06F 2201/85
See application file for complete search history.

(56) References Cited

U.S. PATENT DOCUMENTS

| 7,216,169 | B2 * | 5/2007 | Clinton | G06F 11/008 709/203 |
| 7,502,967 | B1 * | 3/2009 | Li | G06F 11/0715 714/38.14 |
| 8,516,301 | B2 * | 8/2013 | Beck | G06F 11/323 714/15 |
| 8,782,614 | B2 | 7/2014 | Basak et al. | |
| 8,949,187 | B1 * | 2/2015 | Satish | G06F 11/1461 707/640 |
| 8,996,932 | B2 * | 3/2015 | Singh | G06F 11/2294 714/47.3 |
| 2009/0006493 | A1 * | 1/2009 | Draper | G06F 8/71 |
| 2009/0112809 | A1 * | 4/2009 | Wolff | G06F 11/008 |

(Continued)

*Primary Examiner* — Paul Contino
(74) *Attorney, Agent, or Firm* — Vierra Magen Marcus LLP

(57) ABSTRACT

Tracking health of component in a computer system is disclosed. A health score for software components is determined for each of a plurality of time periods. The computing system determines a problem software component whose health score indicates the unhealthy status at a certain point in time. The computing system determines a set of software components that are linked by dependency relationships to the problem software component. The computing system tracks events at which software components in the set have a health score that went from the healthy status to the unhealthy status. The computing system rolls back in time through the events to locate a software component in the set that was first in time to have its health score go from the healthy status to the unhealthy status.

19 Claims, 19 Drawing Sheets

(56) References Cited

U.S. PATENT DOCUMENTS

| | | | | |
|---|---|---|---|---|
| 2010/0218031 A1* | 8/2010 | Agarwal | ............... | G06F 11/079 714/2 |
| 2011/0098973 A1* | 4/2011 | Seidman | ............. | G06F 11/0709 702/179 |
| 2011/0276836 A1* | 11/2011 | Kahana | ............... | G06F 11/0709 714/38.1 |
| 2011/0302294 A1* | 12/2011 | Oostlander | ........... | G06F 11/302 709/224 |
| 2012/0124422 A1* | 5/2012 | Hsiao | ................. | G06F 11/3466 714/26 |
| 2012/0166878 A1* | 6/2012 | Sinha | .................... | G06F 11/079 714/37 |
| 2012/0260135 A1* | 10/2012 | Beck | .................... | G06F 11/323 714/45 |
| 2014/0281734 A1* | 9/2014 | Samuni | ............... | G06F 11/3058 714/39 |
| 2014/0317286 A1* | 10/2014 | Masuda | ................... | G06F 11/34 709/224 |
| 2015/0032884 A1* | 1/2015 | Greifeneder | ............ | H04L 67/10 709/224 |
| 2015/0180739 A1* | 6/2015 | Horn | ......................... | G06F 8/65 709/224 |
| 2015/0309908 A1* | 10/2015 | Pearson | ................ | G06F 11/323 714/57 |
| 2015/0347245 A1* | 12/2015 | Andre | .................... | G06F 11/203 714/6.3 |
| 2016/0153806 A1* | 6/2016 | Ciasulli | ............... | G06F 11/0751 702/184 |

* cited by examiner

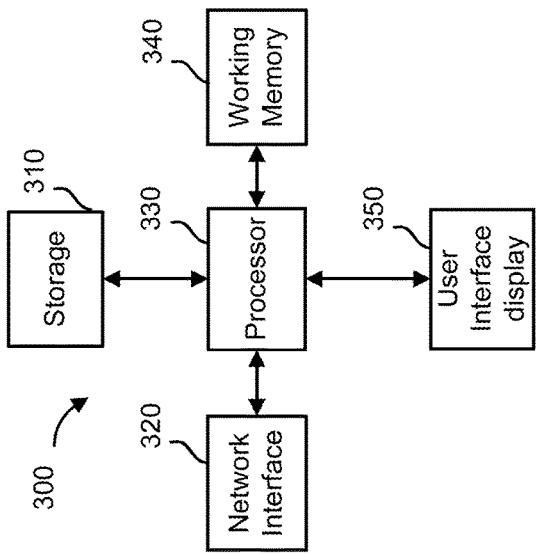
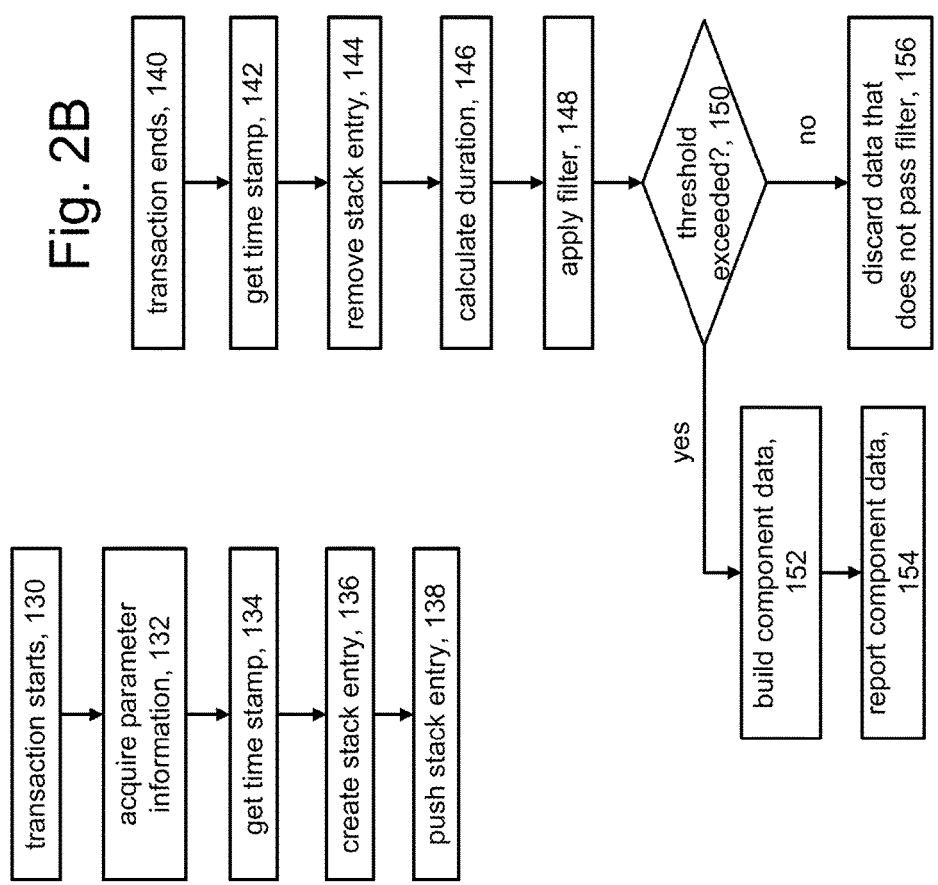

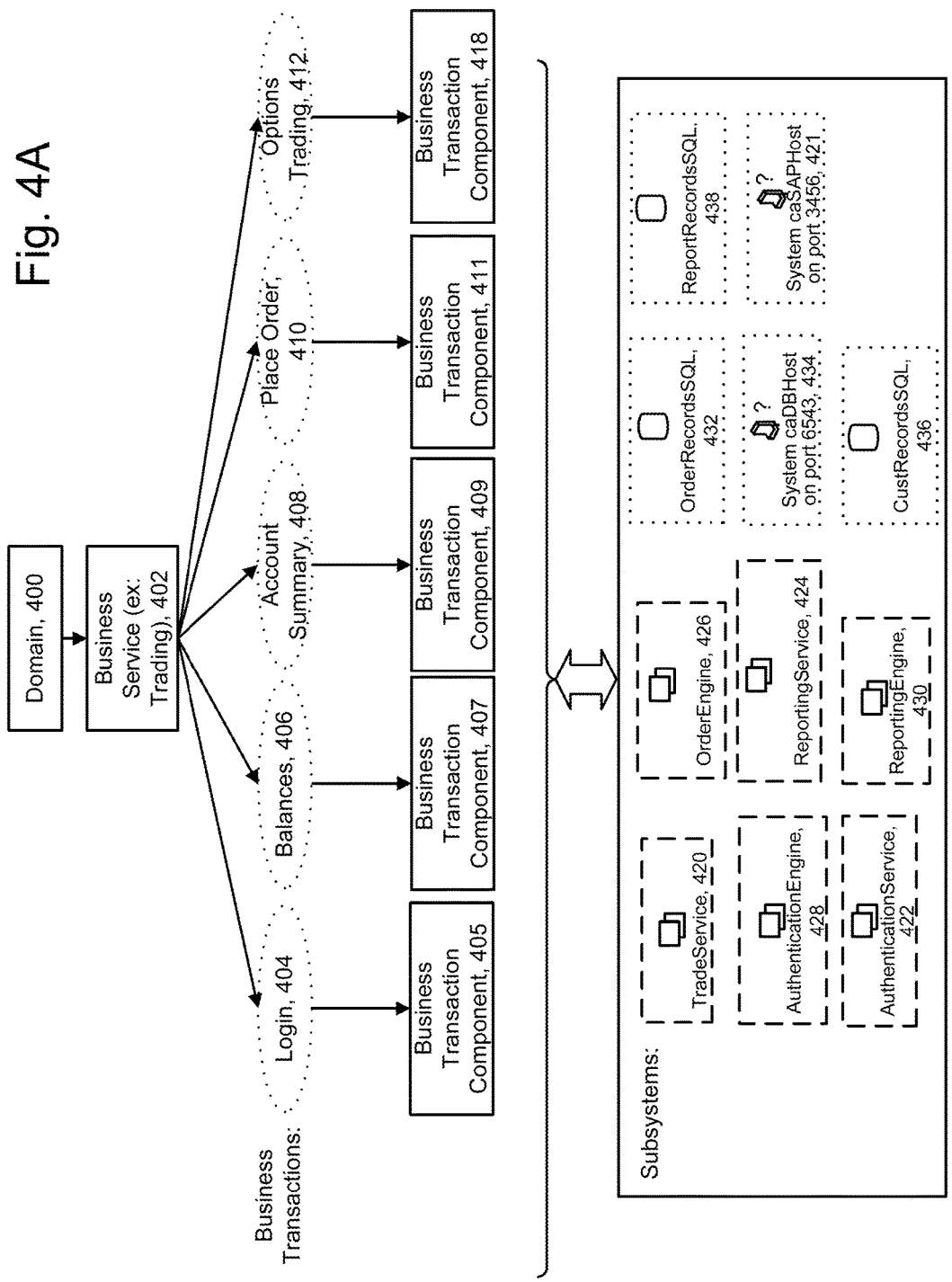

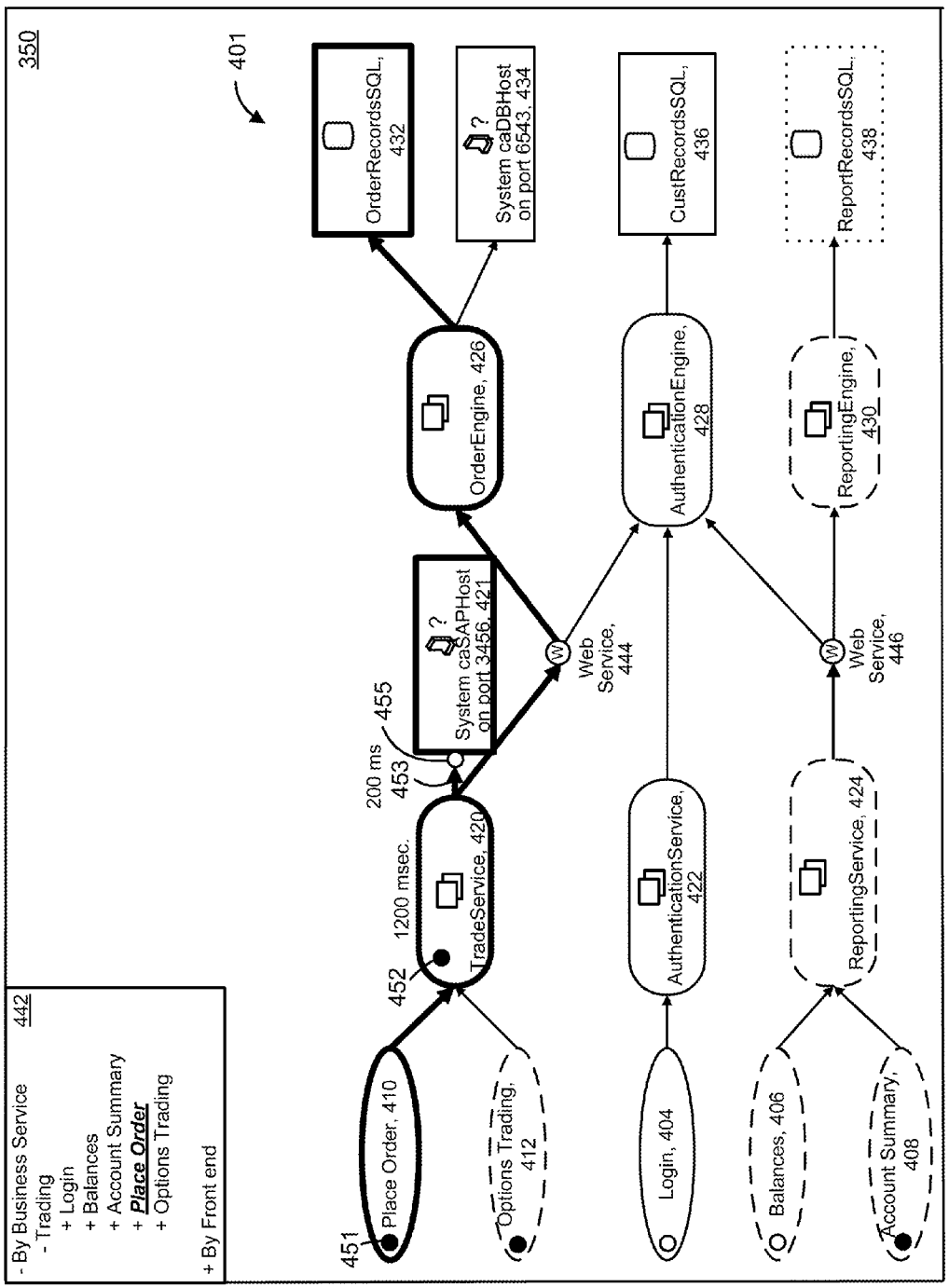

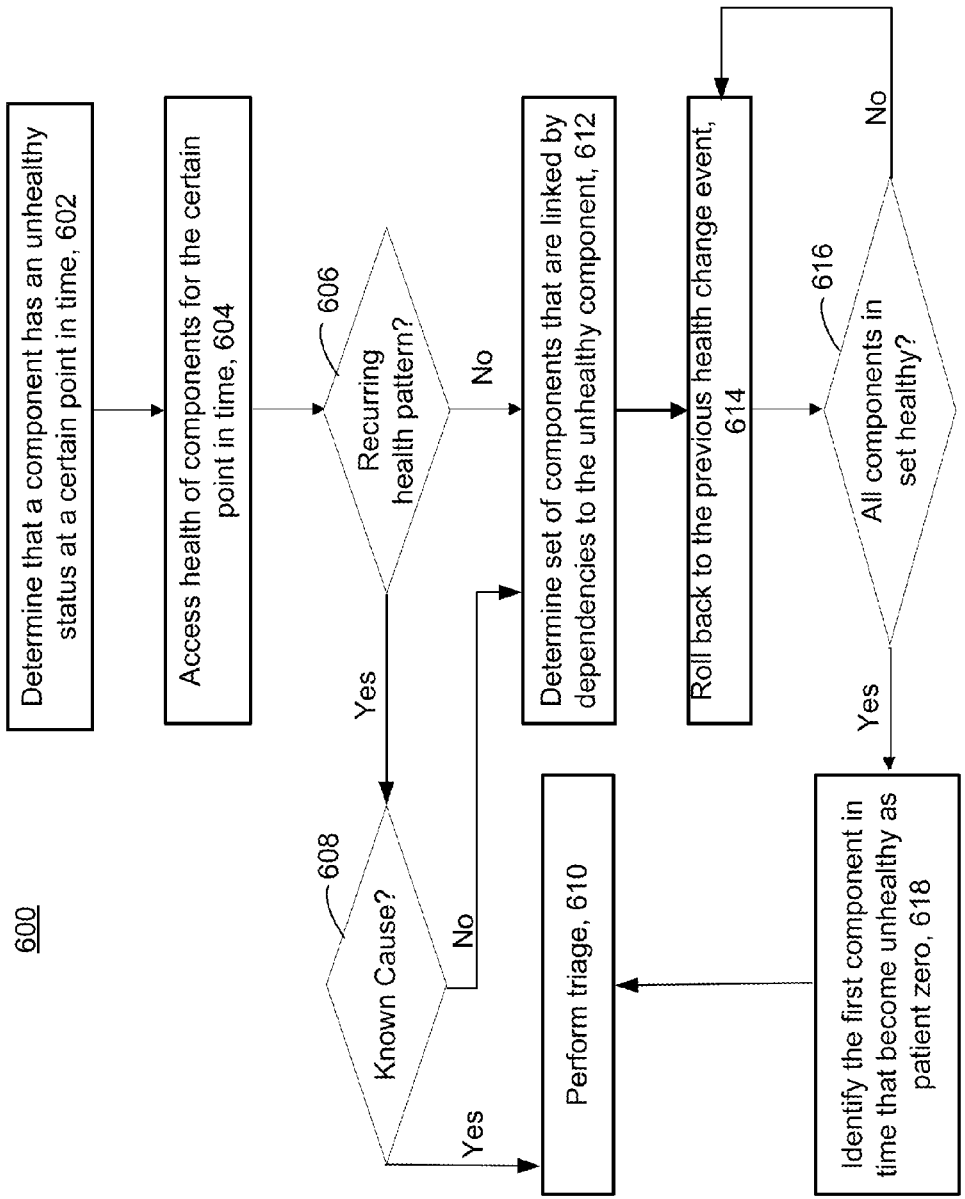

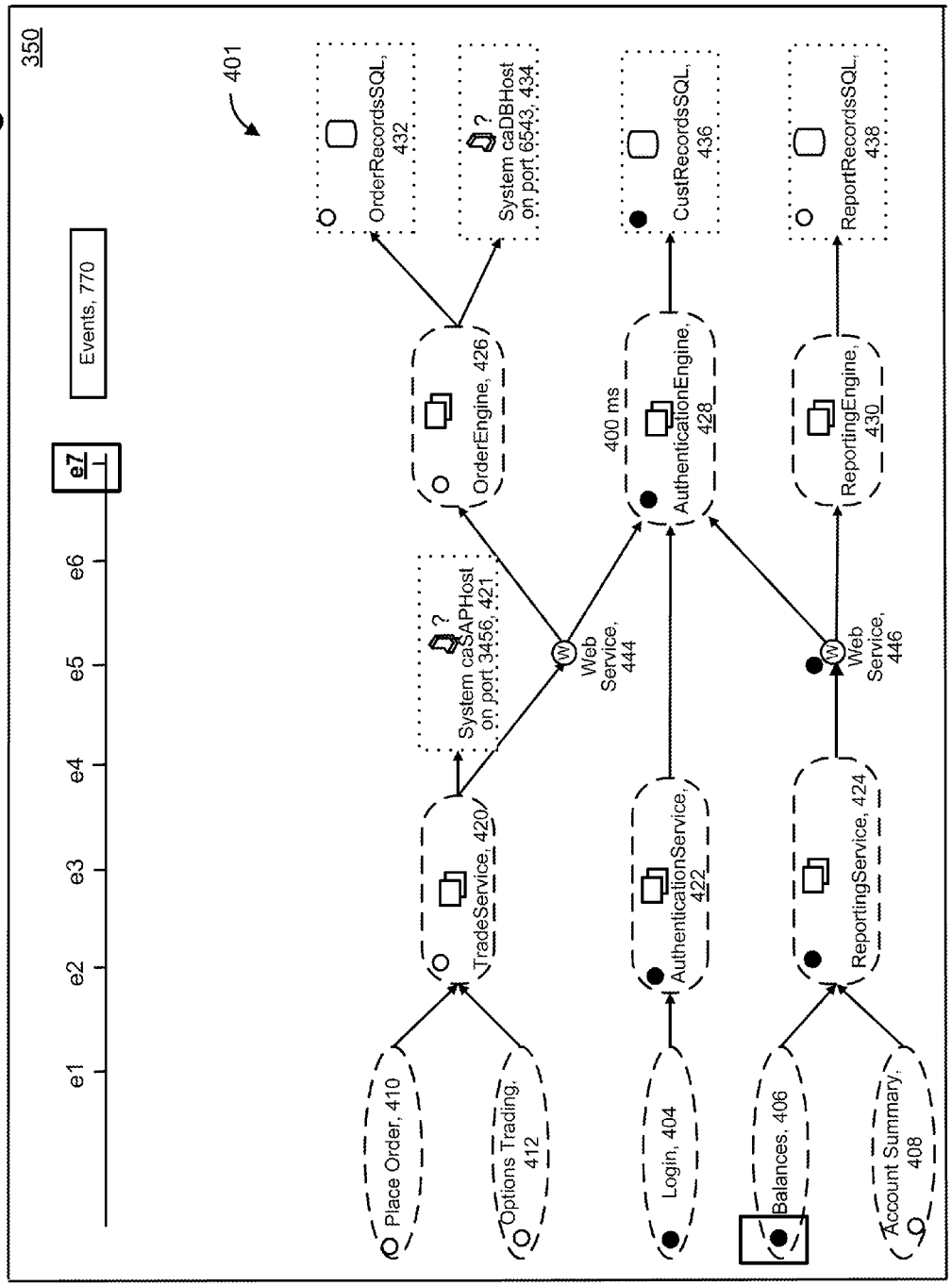

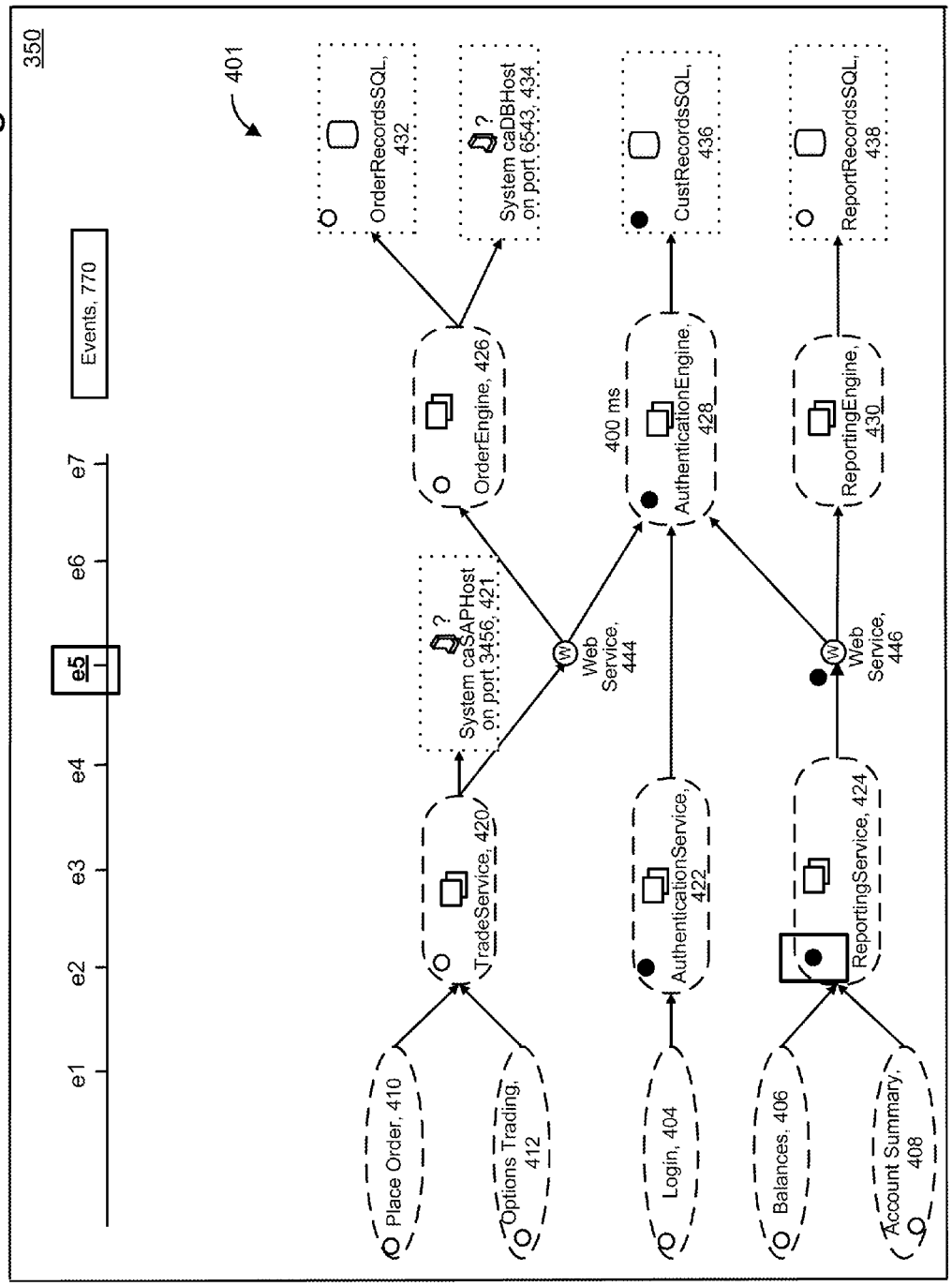

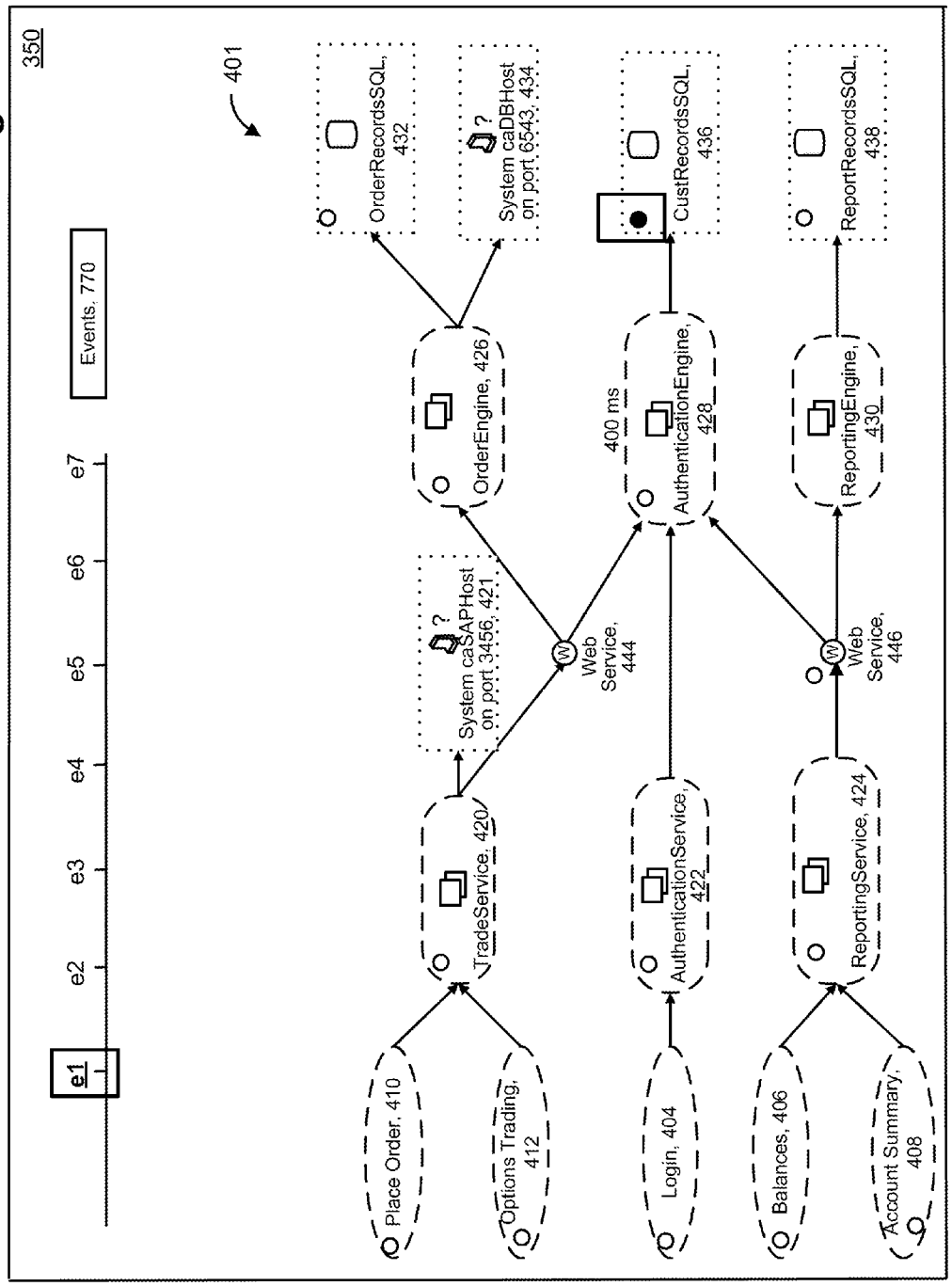

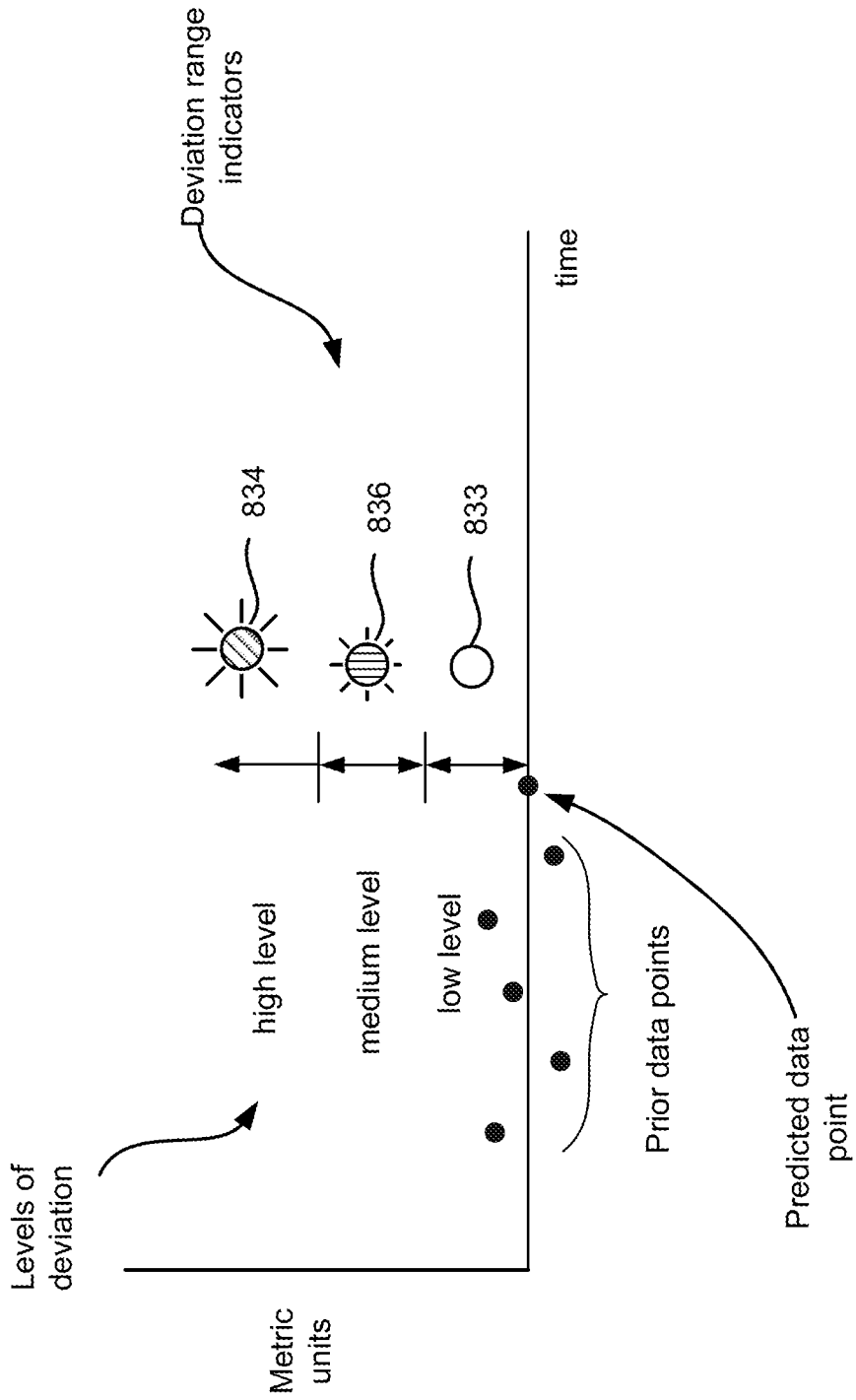

TRACKING HEALTH STATUS IN SOFTWARE COMPONENTS

BACKGROUND

The present disclosure is directed to technology for monitoring software in a computing environment. The present disclosure is directed to technology for performance monitoring software in a computing environment.

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed.

One approach involves monitoring the health of the application by collecting application runtime data regarding the individual software components that are invoked in the application. This approach can use agents that essentially live in the system being monitored. For example, using instrumentation of the software, a thread or process can be traced to identify each software component that is invoked, as well as to obtain runtime data such as the execution time of each software component and the dependencies between the said components. Tracing refers to obtaining a detailed record, or trace, of the steps a computer program executes. One type of trace is a stack trace. Traces can be used as an aid in debugging.

However, diagnosis of problems continues to be difficult and time-consuming. For example, when a transaction or application is failing, the provider wants to know what exactly is going wrong, and why. Improved diagnostic techniques are needed.

SUMMARY

The present disclosure describes a method, apparatus, and computer program product for diagnosing performance problems in a computer system by tracking health problems in software components.

One embodiment includes a method that is performed by a computer system, which comprises the following. The computing system determines a health status for software components for each of a plurality of time periods. The computing system determines a problem software component whose health status indicates an unhealthy status at a certain point in time. The computing system determines a set of software components that are linked by dependency relationships to the problem software component. Multiple software components in the set of software components have the unhealthy status at the certain point in time. The computing system tracks events at which software components in the set went from the healthy status to the unhealthy status. The events correspond to points in time prior to the certain point in time. The computing system rolls back in time through the events to locate a software component in the set that was first in time to go from the healthy status to the unhealthy status.

One embodiment includes an apparatus, comprising a storage device and a processor in communication with the storage device. The processor determines a health status for software components for a plurality of time periods. The processor determines a problem software component of the plurality of software components with an unhealthy status at a certain point in time. The processor determines a set of software components that are linked by dependency relationships to the problem software component at the certain point in time. Multiple software components in the set of software components have the unhealthy status at the certain point in time. The processor determines events at which ones of the software components in the set of software components went from the healthy status to the unhealthy status. The events correspond to points in time prior to the certain point in time. The processor rolls back in time through the events to locate a software component in the set of software components that was first in time to go from the healthy status to the unhealthy status.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a flowchart describing one embodiment of a process for starting the tracing of a transaction.

FIG. 2B is a flowchart describing one embodiment of a process for concluding the tracing of a transaction.

FIG. 3 depicts a computing system of the network of FIG. 1.

FIG. 4A depicts a hierarchy for use in describing the operation of one or more applications.

FIG. 4C depicts the user interface of FIG. 4B, where a Business Transaction of Place Order has been selected by the user.

FIG. 6 is a flowchart of one embodiment of a process of finding a software component that is a root cause of health problems in other software components in a computer system.

FIGS. 7A-7H are diagrams of one embodiment of a user interface display that shows a dependency map.

FIG. 8B shows a time series of prior data points for some metric to illustrate one embodiment of health scores.

DETAILED DESCRIPTION

Figure 1:
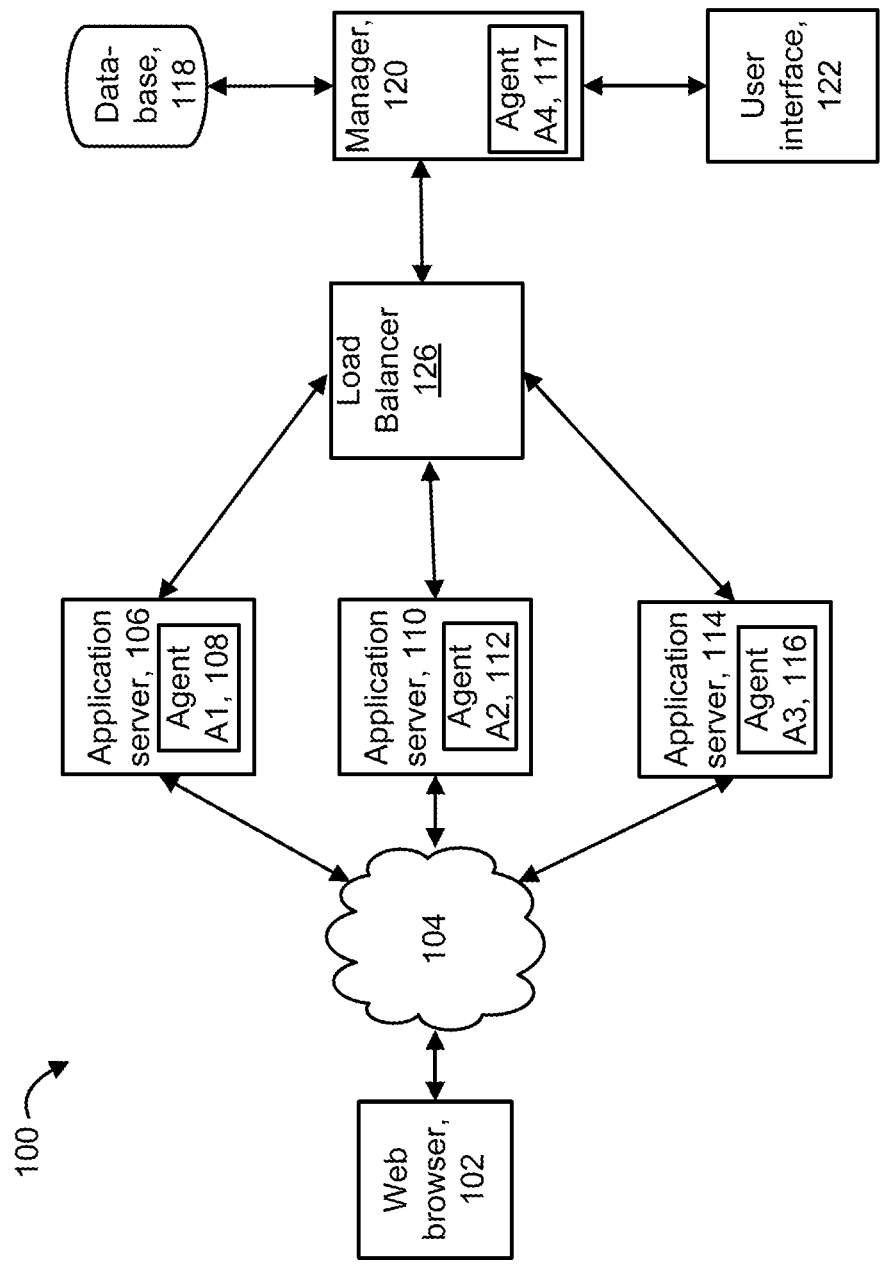
FIG. 1 depicts a system which includes a managed application.

The present disclosure provides a method, apparatus, and computer program product for diagnosing problems in a computer system by tracking changes in the health of software components that execute on a computer system. Moreover, a software component that was a root cause of health problems in other software components may be located based on this tracking.

Similar to how one sick person may infect others who come into contact with that person, an unhealthy software component that executes in a computer system may make other software components with which it has contact unhealthy. As one example, if a database has a health problem that results in symptoms of slow response times, a software component that depends upon accessing data from the database may show symptoms such as a slow response time. Thus, other software components may become unhealthy due to their dependency on the database. In this manner, health problems can propagate through the computer system.

Computer systems can comprise a large number of software components with a variety of interdependencies and these dependencies are transitive, often masking deep dependencies from operators. In a complex large computer system, by the time a problem is discovered, many software components may have been "infected". For example, many software components may be showing signs of underperformance. It can be difficult to find the root cause by simply viewing a list of health metrics for each software component over time without knowing the context in which they are utilized. This is further compounded by the fact some software components get unhealthy at a different rates or experience different symptoms or have different incubation periods than other similar software components.

In one embodiment, the health of various software components in the computer system is tracked over time. When a software component is determined to go from a healthy status to an unhealthy status, an event is recorded. Thus, a series of such events are recorded as the problem spreads. At some point in time, numerous software components may be showing signs of health problems. These numerous software components have dependencies between them, which can be learned by examining how the software components interact. Rather than trying to fix each software component, a search may be made for a software component that is the root cause of the problems in the other software components. To find the software component that is the root cause, the events are rolled back in time. Going back from one event to the prior event shows how the epidemic was spread among the software components. The events may be rolled back until the software component that was the first in time to become unhealthy is found. This software component may be identified as the root cause of the health problems in the other software components. Finding the software component that is the root cause of the health problems in the other software components can save considerable time in problem triage, where sorting out likely causes of a problem is of paramount importance.

In one embodiment, a tool is provided that graphically shows the dependencies between the software components. This tool may monitor application performance by collecting metrics for applications with the help of respective agents for the applications. The metric data which is collected provides an agent-centric view of all the applications (including multiple instances of the same application) that are being monitored. In addition, the tool can show a timeline that lists events corresponding to when various software components went from being healthy to being unhealthy. In response to a user selection of one of the events, the tool shows the user a dependency map of the software components at the time of the event. The dependency map also shows the health status of each software component at that time. By walking backwards through the events, the user is able to see how a health problem spread through the software components.

FIG. 1 depicts a network 100 in which different computing systems provide data to a manager. Example computing systems 106, 110, 114, 126, may include application servers, a load balancer 126, or any other type of computing system having a processor for executing code to achieve a desired functionality. The computing systems can be located remotely from one another or co-located. The computing systems 106, 110 and 114 communicate with a local manager computer 120 in this example. The manager computer 120 could alternatively be remote from the computing systems 106, 110 and 114, in which case communication may occur via the network cloud 104. In this example, there is a load balancer 126 between the computing systems 106, 110 and 114 communicate with a local manager computer 120. The load balancer 126 is optional. The load balancer 126 is an embedded system, in one embodiment.

For example, a corporation running an enterprise application such as a web-based e-commerce application may employ a number of application servers at one location for load balancing. Requests from users, such as from an example web browser 102 of a user, are received via a network cloud 104 such as the Internet, and can be routed to any of the computing systems 106, 110 and 114. The web browser 102 typically accesses the network cloud 104 via an Internet Service Provider, not shown. Agent software running on the computing systems 106, 110 and 114, denoted by Agent A1 (108), Agent A2 (112) and Agent A3 (116), respectively, gather information from an application, middleware or other software, running on the respective computing systems 106, 110 and 114, in one possible approach. Such information may be obtained using instrumentation, one example of which is byte code instrumentation. However, the gathered data may be obtained in other ways as well. The agents essentially live in the computing system being monitored and provide a data acquisition point. The agents organize and optimize the data communicated to the manager 120. In one implementation, an instance of an Application A executes at the computing system 106 and an instance of an Application B executes at the computing system 110. Note that the Agents 108, 112, 116 are not required to live in the computing system being monitored. For example, Agent 4 117 located on the Manager 120 could monitor an application, middleware or other software, running on the respective computing systems 106, 110 and 114. Also, any of the Agents 108, 112, 116, 117 might monitor an application, middleware or other software, running on the load balancer 126.

The manager 120 can be provided on a separate computing system such as a workstation which communicates with a user interface 122, such as a monitor or display device, to display information based on data received from the agents. The manager can also access a database 118 to store the data received from the agents. In the example provided, the computing systems can communicate with the manager 120 without accessing the network 104. For example, the communication may occur via a local area network. In other designs, the manager 120 can receive data from the agents of a number of computing systems via the network cloud 104. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 120 and user interface display 122 might be provided at a corporate headquarters location. Other applications which are not necessarily web-based or involve retail or other sales, similarly employ agents and managers for managing their systems. For example, a bank may use an application for processing checks and credit accounts. Moreover, in addition to the multi-computing system arrangements mentioned, a single computing system can be monitored as well with one or more agents.

Various approaches are known for instrumenting software to monitor its execution. For example, as mentioned at the outset, tracing may be used to track the execution of software. One example of tracing is discussed in U.S. Pat. No. 7,870,431, titled "Transaction Tracer," incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it is referred to as a managed application. The agent software receives information from the probes and may communicate the information to another process, such as at the manager 120, or process the information locally, such as to determine whether the information indicates an abnormal condition. The agent thus collects and summarizes information received from the probes. The probes collect information as defined by a directives file. For example, the information from the probes may indicate start and stop times of a transaction or other execution flow, or of individual software components within a transaction/execution flow. This information can be compared to pre-established criteria to determine if it within bounds. If the information is not within bounds, the agent can report this fact to the manager so that appropriate troubleshooting can be performed. The agents 108, 112 and 116 are typically aware of the software executing on the local computing system 106, 110 and 114, respectively, with which they are associated.

The probes can report a standard set of metrics which include: CORBA method timers, Remote Method Invocation (RMI) method timers, Thread counters, Network bandwidth, JDBC update and query timers, Servlet timers, Java Server Pages (JSP) timers, System logs, File system input and output bandwidth meters, Available and used memory and EJB (Enterprise JavaBean) timers. A metric is a measurement of a specific application activity.

An agent reports information about transactions, which identifies resources which are accessed by an application. In one approach, when reporting about transactions, the word Called designates a resource. This resource is a resource (or a sub-resource) of a parent component, which is a consumer. For example, assume that Servlet A is the first component invoked in a transaction. Under the consumer Servlet A (see below), there may be a sub-resource Called EJB that this server needs to access during its execution. Consumers and resources can be reported by the agent in a tree-like manner. Data for a transaction can also be stored according to the tree. For example, if a Servlet (e.g. Servlet A) is a consumer of a network socket (e.g. Socket C) and is also a consumer of an EJB (e.g. EJB B), which in turn is a consumer of a JDBC (e.g. JDBC D), the tree might look something like the following:

---
Servlet A
  Data for Servlet A
  Called EJB B
    Data for EJB B
    Called JDBC D
      Data for JDBC D -continued Called Socket C
  Data for Socket C

---

In one embodiment, the above tree is stored by the Agent in a stack, called the Blame Stack. When transactions are started, they are pushed onto the stack. When transactions are completed, they are popped off the stack. In one embodiment, each transaction on the stack has the following information stored: type of transaction, a name used by the system for that transaction, a hash map or dictionary of parameters, a timestamp for when the transaction was pushed onto the stack, and sub-elements. Sub-elements are Blame Stack entries for other components (e.g. methods, process, procedure, function, thread, set of instructions, etc.) that are started from within the transaction of interest. Using the tree as an example above, the Blame Stack entry for Servlet A would have two sub-elements. The first sub-element would be an entry for EJB B and the second sub-element would be an entry for Socket Space C. Even though a sub-element is part of an entry for a particular transaction, the sub-element will also have its own Blame Stack entry. As the tree above notes, EJB B is a sub-element of Servlet A and also has its own entry. The top (or initial) entry (e.g., Servlet A) for a transaction, is called the root component. Each of the entries on the stack is an object.

FIG. 2A is a flowchart describing one embodiment of a process for starting the tracing of a transaction. The steps are performed by the appropriate Agent(s). In step 130, a transaction starts. In one embodiment, the process is triggered by the start of a method (e.g., the calling of a "loadTracer" method). In step 132, the Agent acquires the desired parameter information. In one embodiment, a user can configure which parameter information is to be acquired via a configuration file or a UI. The acquired parameters are stored in a hash map or dictionary, which is part of the object pushed onto the Blame Stack. In other embodiments, the identification of parameters is pre-configured. There are many different parameters that can be stored. In one embodiment, the actual list of parameters used is dependent on the application being monitored. The table below provides examples of some parameters that can be acquired.

| Parameters | Appears in | Value |
|---|---|---|
| UserID | Servlet, JSP | The UserID of the end-user invoking the http servlet request. |
| URL | Servlet, JSP | The URL passed through to the servlet or JSP, not including the Query String. |
| URL Query | Servlet, JSP | The portion of the URL that specifies query parameters in the http request (text that follows the '?' delimiter). |
| Dynamic SQL | Dynamic JDBC Statements | The dynamic SQL statement, either in a generalized form or with all the specific parameters from the current invocation. |
| Method | Blamed Method timers (everything but Servlets, JSP's and JDBC Statements) | The name of the traced method. If the traced method directly calls another method within the same component, only the "outermost" first encountered method is captured. |
| Callable SQL | Callable JDBC statements | The callable SQL statement, either in a generalized form or with all the specific parameters from the current invocation. |
| Prepared SQL | Prepared JDBC statements | The prepared SQL statement, either in a generalized form or with all the specific parameters from the current invocation. |
| Object | All non-static methods | toString( ) of the this object of the traced component, truncated to some upper limit of characters. |

| Parameters | Appears in | Value |
|---|---|---|
| Class Name | All | Fully qualified name of the class of the traced component. |
| Param_n | All objects with WithParams custom tracers | toString() of the nth parameter passed to the traced method of the component. |
| Primary Key | Entity Beans | toString( ) of the entity bean's property key, truncated to some upper limit of characters. |

Parameters can include query, cookie, post, URL and session type name/value pairs.

In step 134, the system acquires a timestamp indicating the current time. In step 136, a stack entry is created. In step 138, the stack entry is pushed onto the Blame Stack. In one embodiment, the timestamp is added as part of step 138. The process is performed when a transaction is started. A similar process is performed when a sub-component of the transaction starts (e.g., EJB B is a sub-component of Servlet A—see tree described above).

FIG. 2B is a flowchart describing one embodiment of a process for concluding the tracing of a transaction. The process is performed by an Agent when a transaction ends. In step 140, the process is triggered by a transaction (e.g., method) ending (e.g., calling of a method "finishTrace"). In step 142, the system acquires the current time. In step 144, the stack entry is removed. In step 146, the execution time of the transaction is calculated by comparing the timestamp from step 142 to the timestamp stored in the stack entry. In step 148, the filter for the trace is applied. For example, the filter may include a threshold period of one second. Thus, step 148, would include determining whether the calculated duration from step 146 is greater than one second. If the threshold is not exceeded (step 150), then the data for the transaction is discarded. In one embodiment, the entire stack entry is discarded. In another embodiment, only the parameters and timestamps are discarded. In other embodiments, various subsets of data can be discarded. In some embodiments, if the threshold period is not exceeded then the data is not transmitted by the Agent to other components in the system of FIG. 1. If the duration exceeds the threshold (step 150), then the Agent builds component data in step 160. Component data is the data about a transaction that will be reported. In one embodiment, the component data includes the name of the transaction, the type of the transaction, the start time of the transaction, the duration of the transaction, a hash map or dictionary of the parameters, and all of the sub-elements (which can be a recursive list of elements). Other information can also be part of the component data. In step 162, the Agent reports the component data by sending the component data via the TCP/IP protocol to Manager 120.

FIG. 2B represents what happens when a transaction finishes. When a sub-component finishes, however, the steps performed include getting a time stamp, removing the stack entry for the sub-component and adding the completed sub-element to previous stack entry. In one embodiment, the filters and decision logic are applied to the start and end of the transaction, rather than to a specific sub-component.

Note, in one embodiment, if the transaction tracer is off, the system will still use the Blame Stack; however, parameters will not be stored and no component data will be created. In some embodiments, the system defaults to starting with the tracing technology off. The tracing only starts after a user requests it, as described above.

FIG. 3 depicts a computing system of the network of FIG. 1. The computing system 300 is a simplified representation of a system which might be used as one of the web browsers 102, application server, load balancer 126, managers 120 and/or user interfaces 122, such as discussed in connection with FIG. 1. The computing system 300 includes a storage device 310 such as a hard disk or portable media, a network interface 320 for communicating with other computing systems, a processor 330 for executing software instructions, a working memory 340 such as RAM for storing the software instructions after they are loaded from the storage device 310, for instance, and a user interface display 350 such as one or more video monitors. A user interface can be provided as one or more monitors. The storage device 310 may be considered to be a tangible, non-transitory processor- or computer-readable storage device having processor readable code embodied thereon for programming the processor 330 to perform methods for providing the functionality discussed herein. The user interface display 350 can provide information to a human operator based on the data received from one or more agents. The user interface display 350 can use any known display scheme, whether graphical, tabular or the like. In addition to an on-screen display, an output such as a hard copy such from a printer can be provided.

The database 118 may be included in the storage device 310 when the storage device 310 is part of a computing system 300 such as an application server, manager and/or user interfaces. The storage device 310 can represent one or more storage devices which store data received from one or more agents, and which can be accessed to obtain data to provide a user interface as described herein. The storage device 310 can represent a data store.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium (including a computer readable storage medium) that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 4A depicts a hierarchy for use in describing the operation of one or more applications. A specific example relating to a Business Service involving securities trading is presented. The different levels of the hierarchy can be defined based on any desired organizational structure. For example, the hierarchy can include human-facing terminology, that is, terminology which facilitates understanding of client's interactions with a monitored application. A hierarchy may encompass any type of interaction with an application, whether the interaction is in the realm of a for-profit business, such as for e-commerce transactions, educational organization or government organization, for instance. Further, the one or more hierarchies can include nodes at different levels of the one or more hierarchies, where each node has a descriptive name. The hierarchy can be considered to be an abstract construct which provides a way to organize information about how an application executes in a manner which is more understandable to the human operator.

A top level of the hierarchy is a domain level 400 named "Domain." A next level of the hierarchy is a Business Service level 402. An example of a Business Service relates to trading involving a stock or other financial instrument using a web site. Thus, "Trading" can be the name of a node at the Business Service level of the hierarchy. A specific instance of the Trading Business Service occurs, e.g., when a particular user executes a trade. Other example Business Services include "Buy Book" for a book-selling web site, and "Enroll in benefits" for a employees enrolling in a benefits program.

A next level of the hierarchy is a Business Transaction level. As mentioned, a Business Transaction can represent a task from a client perspective, such as logging into a web site, ordering an item, and so forth. A Business Service can be made up of a number of Business Transactions. For example, for Trading, the Business Transactions can include: Login 404 (e.g., login to the web site), Balances 406 (e.g., obtain a balance of an account), Account Summary 408 (e.g., obtain a report of recent buy/sell activity), Place Order 410 (e.g., place an order to buy or sell a security such as a stock or bond-something other than an option) and Options Trading 412 (perform an action such as researching and/or making an options trade). A specific instance of Login occurs when a user attempts to login to an account.

Further, a Business Transaction can be associated with one or more Business Transaction Components. A Business Transaction Component can be any type of component of an application, such as a servlet or EJB. In one approach, one of the components of an application is set as a Business Transaction Component, which is an identifying transaction component for a Business Transaction. An individual transaction that the Business Transaction Component is associated with the identifying transaction. A transaction can represent a sequence of software components which are invoked in response to a request from a client, to provide a corresponding response to the client. For example, a Business Transaction Component can be identified by determining when component data reported by an agent matches a set of rules. This definition can include, e.g., a specified URL host name, URL parameters, HTTP post parameters, cookie and/or session manager parameters. Additionally, or alternatively, the definition may require a transaction to start with a specified URL host name. The agent or manager, for instance, can compare the component data against the set of rules to determine when a Business Transaction Component is present in a Business Transaction. If a Business Transaction Component is detected, then the associated Business Transaction is of a specified type. For example, if the Business Transaction Component 405, 407, 409, 411 or 413 is detected, then the associated Business Transaction is Login 404, Balances 406, Account Summary 408, Place Order 410 or Options Trading 412, respectively.

For a transaction which is associated with a web page, the Business Transaction Component might be invoked in connection with a low level component used in a web page, such as an image (e.g., .gif file), cascading style sheet (e.g., .css file), JavaScript code component (e.g., .js file) and so forth. For a transaction which is associated with a servlet, a Business Transaction Component might be invoked in connection with a JavaServer Page (JSP) that is loaded into a secondary frame.

Typically, each instance of a Business Transaction involves execution of code of a sequence of one or more of applications or other subsystems. The subsystems depend on one another, e.g., call one another, in a serial or branched chain. Different Business Transactions can sometimes use a common subsystem. A subsystem can include one or more software components which perform a specific task.

The example subsystems include instrumented subsystems which are represented by dashed line boxes, and which are typically front end subsystems, as well as un-instrumented subsystems which are represented by dotted line boxes, and which are typically back end subsystems. A front end subsystem can call another front end subsystem, such as via a Web Services call. Or, a frontend subsystem can call a backend subsystem. A full range of performance metrics can be obtained from an instrumented subsystem. Limited information may be obtained regarding an un-instrumented subsystem from the methods that are used to call out to them from the instrumented subsystems. In the case of un-instrumented databases, for example, a JDBC driver (located in the same Java Virtual Machine (JVM) as the calling front end) provides metrics that give us an idea of the responsiveness of the database. In the case of un-instrumented mainframes, there is usually a method that calls out to the mainframe on a specified port on the mainframe, and we can measure how long that call takes or if it stalls or reports an error.

In many cases, an un-instrumented subsystem is a back end subsystem such as a mainframe, database or some other un-instrumented computing system. These are unknown components/destinations. The instrumented subsystems include: TradeService 420, OrderEngine 426, AuthenticationEngine 428, ReportingService 424, AuthenticationService 422 and ReportingEngine 430. The un-instrumented subsystems include: OrderRecordsSQL 432, ReportRecordsSQL 438, a system caDBHost 434, which is accessed via its port number 6543, a system caSAPHost 421, which is accessed via its port number 3456 and CustRecordsSQL 436. A subsystem which includes SQL in its name is a Structured Query Language (SQL) database. A "?" indicates that the subsystems 434 and 421 are unknown.

Component-oriented programming models are useful in allowing the programmer to assemble an application or other program from building blocks referred to as components. Each component can perform a specific function which fits in with an overall functionality of the software. Furthermore, a software component can call other software components, as well as calling itself, in a recursive call, so that a sequence of software components is invoked in a program. One example of a component oriented programming model is J2EE, which can employ components such as a Java Server Page, an Enterprise Java Bean (EJB), a servlet, and a Java Database Connectivity (JDBC) component. JDBC is an Application Programming Interface (API) for the JAVA™ programming language that defines how a client may access a database. It provides methods for querying and updating data in a database. However, other component oriented programming models such as .NET may also be used. Moreover, the programming model need not be object oriented.

In one possible implementation, a software component is a class-method (CM) pair. For example, a servlet is one example of a JAVA class. It is an object that receives a request and generates a corresponding response. A class-method pair can be represented by the notation class..method. An example format of a class-method pair is: ServletA1.EnterOrder.

In some embodiment, a tool is provided to display dependency graphs (also referred to as dependency maps). FIGS. 4B, 4C, and 7A-7H show user interfaces displaying dependency graphs. A dependency graph displays a dependency relationship (map) between various software components of an application or business transactions as a directed graph (digraph). The software components can be Servlets, EJBs, Databases, message queues (MQs) and so forth.

Specifically, a graph G=(V, E) includes a set V of vertices (also called nodes), and a set E of edges. Each edge represents an ordered pair of vertices. The edges in a directed graph are ordered pairs, i.e., the two vertices the edge connects are ordered. A directed graph edge can be drawn as an arrow pointing from one vertex (source) to another (target). Thus, the head of the arrow is at the target vertex and the tail of the arrow is at the source vertex. Further, a simple path from v1 to vk is a sequence of vertices v1, v2 . . . vk that are connected by edges (v1, v2), (v2, v3) . . . (vk–1, vk). If an application is represented by a directed graph, then a business transaction can be considered as a simple path through that graph. A subgraph S of a graph G is a graph whose vertices and edges are a subsets of vertices and edges of graph G. A subgraph S1 is called edge induced subgraph of G, if it consists of a subset of edges of graph G. A business service can be considered as an edge-induced subgraph of that graph. The logical view of the dependency graph is the union of all physical dependencies between various components across agents. Potentially, an application dependency graph may depict multiple business transactions.

Figure 4B:
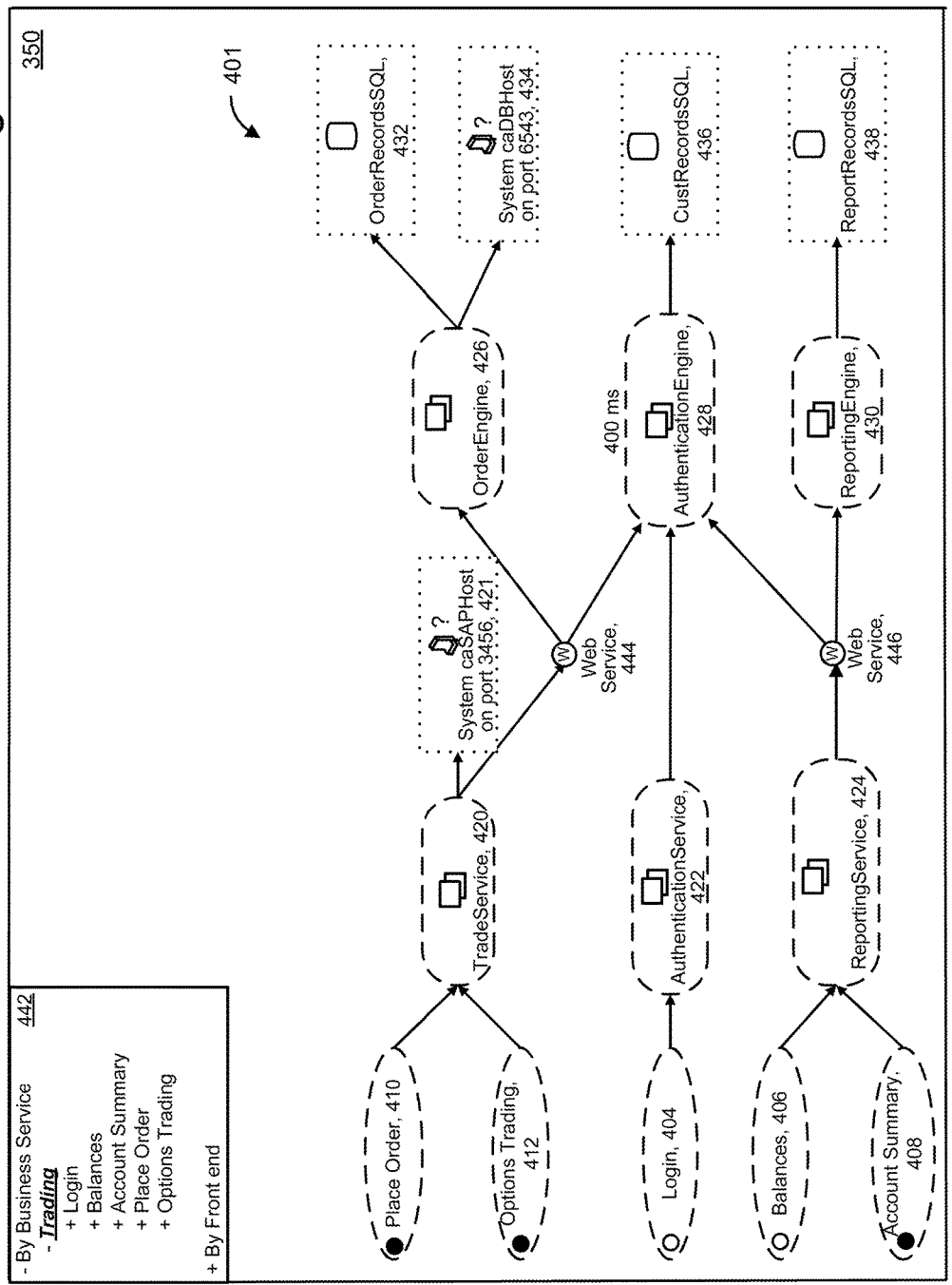
FIG. 4B depicts a further example of a user interface, consistent with the hierarchy of FIG. 4A.

FIG. 4B depicts a further example of a user interface, consistent with the hierarchy of FIG. 4A, where a Business Service of Trading has been selected by the user. The UI 350 includes a region 442 in which a tree is provided to allow the user to select a view based on a Business Service or front end. A Business Service of Trading is selected. Trading includes the Business Transactions of Balances, Login, Place Order, Options Trading and Account Summary as discussed.

In response to this selection, a number (one or more) of associated Business Transactions, subsystems of the Business Transactions, and edges which show dependencies among the subsystems, are displayed in the dependency graph 401. The oval-shaped nodes 404, 406, 408, 410 and 412 on the left hand side identify the Business Transactions.

Edges indicate which subsystem is first invoked for a Business Transaction, and the subsystems which are subsequently invoked. In some cases, a common subsystem is invoked for different Business Transaction instances. The software components which are invoked for a given Business Transaction instance can be separately tracked using unique identifiers, even when the software components are at the same subsystem. Moreover, it is possible for separate instances of a software component or application to be invoked at a subsystem in different Business Transaction instances. Again, these separate instances can be separately tracked.

Also, note that separate instances of the same Business Transaction need not invoke the same subsystems. For instance, due to an error or network failure or availability, a Business Transaction instance may not invoke a particular subsystem which would otherwise be invoked when no error occurs. Or, due to the time of day or available resources, separate instances of the same Business Transaction can invoke different subsystems. Many variations are possible.

The border of the nodes is used to depict whether the node is highlighted, and in some cases, a type of highlighting. Highlighting is one way to visually distinguish a node or edge from other nodes or edges, respectively. Different colors may also be used. In one approach, a dotted or dashed line border indicates no highlighting, while a solid line indicates highlighting. The highlighting of a node can be responsive to a user selection in the region 442 and to a user selection of the node itself in the UI. Various highlighting, color coding and other visual effects can be provided to convey information to the user. Some of the subsystem nodes include: (a) a symbol such as two overlapping screens which represents a front end or aggregated front end (e.g., all servlets that share the same application context), (b) a cylinder-shaped symbol that represents a database or (c) a symbol that represents an unknown (un-instrumented) subsystem which is the destination of a socket call, to identify a type of the subsystem.

Other types of notations involve metrics and alerts. Users are allowed to create alerts on these nodes and edges to monitor the health of an application and its relationship with its back ends. An alert icon for a vertex or an edge shows up if an alert is set on their performance metric. The alert icon is an indicator of an application's performance and helps the user monitor and diagnose the health of an application and its back ends. Alerts are available for Business Transactions (based on the associated component data), for a front end's overall performance ("Health"), and for back end calls made by the front end to an un-instrumented back end or to another front end. Calls made to another front end can be made through Web Services or EJB Clients to appear as such on the graph. As mentioned, these alerts can be created and configured by a user. Thus, any given Business Transaction, front end, or back end call might or might not have an alert defined for it.

The front end subsystems can make a call out of the application server through a socket. Those calls could be Web Services calls, JDBC driver calls or other types of calls. Web Services are typically application programming interfaces (API) or Web APIs that are accessed via Hypertext Transfer Protocol (HTTP) and executed on a remote system hosting the requested services. These calls, and others such as the JDBC driver calls, are still in the application server so we can detect them and obtain metrics regarding them, but since they call out of the application server, they are referred to as back end calls. The destinations of these back end calls are either other front ends (in the case of Web Services and some EJB calls) or un-instrumented back end components. Most of these un-instrumented software components can be at least partially identified from the back end call; for instance, JDBC driver calls are labeled with their destination database name, and the default socket calls are labeled with the destination host and port. In other cases, the user may have defined custom calls and labeled them with their destination. In all these cases, the UI can provide a box representing the back end destination, labeled appropriately and with an icon depicting a database or other appropriate type of software component.

For instance, if there is a call through a socket and we have instrumented the call and knew that it took 56 milliseconds, but we do not know its destination (what subsystem it called), we can display that time metric in the UI alongside a back end node showing an "unknown component" icon and labeled with the system hostname and port. The back ends 421, 432, 434, 436 and 438 are essentially dummy nodes in the graph because they represent a destination which is not instrumented and for which we therefore have no information reported by the destination. For a call from one front end to another, full instrumentation is available. The call may be made, e.g., via Web Services or an EJB client. All Web Services calls originating from a single front end are aggregated and represented as a single "Web Services" back end call; thus, unlike other types of calls, a Web Services call may have more than one destination. In this case, the back end call will appear as a forking or branching arrow in the graph. Web Services 444 and 446 (represented by "W") represent two such forking Web Services calls; contrast these with the call between AuthenticationService 422 and AuthenticationEngine 428, which is also a Web Services call, but with a single destination.

The TradeService node 420, for instance, can represent a summary of multiple instances of the TradeService subsystem which run across multiple machines. The Web Services 444 are associated with one or more computing system/machines on which the TradeService 420 subsystem runs, and the Web Services 446 are associated with one or more computing system/machines on which ReportingService 424 subsystem runs. The metric or alert icons for Web Services 444 and 446 represent the performance or health of the method call(s) that were made from one computing system to a next computing system.

In one approach, the alert relates to a time metric such as a response time. The alerts can be configured based on any type of performance metric. For example, instrumentation can yield many types of performance metrics, including an average execution or response time of a software component, an invocation rate per second or per interval, a count of invocations, a concurrency metric indicating a number of invocations that have started but not finished per interval, and a stalled metric indicating a number of invocations that have started whose method invocation times have exceeded a specific threshold per interval. Further, the data can identify a garbage collection heap size, a bandwidth metric indicating file and socket activity, a number of threads, system logs, exceptions, memory leaks and software component interactions. These are examples of software component data obtained at application runtime and reported by an agent. Alerts can be provided for any of the items.

Moreover, an alert can be configured based on one or more performance metrics for a Business Transaction Component. For example, an alert can represent an average response time of a subsystem over a specified period of time.

Based on the alerts and metrics icons, the user can take various steps to obtain further information regarding the Business Transactions, subsystems and calls depicted in the UI. In one approach, the user is guided by the presence of the alerts and metrics icons and seeks to obtain further information regarding the associated Business Transactions, subsystems and calls, such as to diagnose a problem. In one embodiment, the alert triggers the system to automatically determine a software component that was the root cause of the alert. This may involve tracking health changes in software components and rolling back through the health changes to locate the root cause of the alert.

Referring again to the specific Business Transactions and their subsystems on the dependency map, the UI indicates that Place Order 410 and Options Trading 412 both invoke the front end application/subsystem, TradeService 420. In an example scenario, a user initiates Place Order 410 by defining an order which is to be placed, e.g., to buy or sell a stock or bond. All user inputs, and information or instructions presented to the user, can be provided via a web page or other UI. Or, a user initiates Options Trading 412 by defining a trade involving an option, such as a put or call. In either case, TradeService is used. TradeService calls System caSAPHost 421, such as to obtain additional information to process the order/trade. Little is known about the System caSAPHost 421 because it is not instrumented, so the node for it is merely a placeholder. The port of the computing system 421 which is called by the instance of TradeService is known (e.g., port 3456), and this information is used to decorate the node 421. System caSAPHost 421 could call another host or resource (not shown) as well, but this would not be depicted.

In computer networking, a port is an application-specific or process-specific software construct serving as a communications endpoint. It is used, e.g., by Transport Layer protocols of the Internet Protocol Suite, such as Transmission Control Protocol (TCP) and User Datagram Protocol (UDP). A specific port is identified by its number, commonly known as the port number, the IP address with which it is associated, and the protocol used for communication. TCP and UDP specify a source and destination port number in their packet headers. A process associates its input or output channel file descriptors (sockets) with a port number and an IP address, a process known as binding, to send and receive data via a network. The operating system's networking software has the task of transmitting outgoing data from all application ports onto the network, and forwarding arriving network packets to a process by matching the packets IP address and port numbers.

Processes create associations with transport protocol ports by means of sockets. A socket is the software structure used as the transport end-point. It is created by the operating system for the process and bound to a socket address which consists of a combination of a port number and an IP address. Sockets may be set to send or receive data in one direction at a time (half duplex) or simultaneously in both directions (full duplex).

TradeService 420 uses one or more Web Services (aggregated into a Web Services nodes 444) to request the order/trade. Web Services 444 in turn call: (a) the OrderEngine subsystem 426, which processes the order/trade, and/or (b) the AuthenticationEngine subsystem 428, which authenticates the order/trade, such as by verifying the user's credentials. The graph does not necessarily indicate that TradeService calls both of these other subsystems at approximately the same time or at different times (e.g., maybe it was after the call to the OrderRecordsSQL database was made); as part of the same Business Transaction or as part of different Business Transaction (there are two Business Transactions associated with TradeService, after all); etc. It's also possible they were both called as part of the same Business Transaction but during different instances of it. The graph tells us that at some point in a specified time period, TradeService called both of these front ends, using Web Services 444.

The OrderEngine subsystem 426 calls two back ends to service one or more calls from Web Services 444: the OrderRecordsSQL database 432, which stores order records using SQL, and System caDBHost 434. System caDBHost 434 may be used to obtain additional information to process the order/trade. The AuthenticationEngine subsystem 428 calls the CustRecordsSQL database 436, which stores customer records, such as to confirm that the user/customer is authorized to place the order/trade.

The Business Transaction of Login 404 involves the front end subsystem, AuthenticationService 422. In an example scenario, Login invokes the AuthenticationService subsystem 422 which in turn calls the AuthenticationEngine subsystem 428, which could be on the same server, or a different server, than the AuthenticationService subsystem 422. The AuthenticationEngine subsystem 428 calls the CustRecordsSQL database 436 to access customer records to confirm that the user login matches the password. The control flow returns to the AuthenticationService subsystem 422 at which point the instance of the Login Business Transaction ends.

Both Balances 406 and Account Summary 408 invoke a common front end application/subsystem, ReportingService 424. In an example scenario, a user initiates Balances by making a request to obtain an account balance, e.g., to learn the amount of funds in a particular account. Or, a user initiates Account Summary 408 by making a request to obtain a report (e.g., statement) of recent transactions, e.g., orders/trades, fund transfers and so forth. In either case, ReportingService 424 processes the report request by calling the Web Services 446, which in turn calls the AuthenticationEngine subsystem 428, which may call the CustRecordsSQL database 436 to access customer records to confirm that the user/customer is authorized to obtain a report.

In one implementation, the control flow returns to the ReportingService 424, which makes another call via the Web Services 446 to the ReportingEngine subsystem 430, which fulfills the report request by calling the ReportRecordsSQL database 438, to obtain records which are used to provide the report. This call to Web Services 446 may include information which specifies the type of report desired, an account identifier, a time frame involved and so forth.

FIG. 4C depicts the user interface of FIG. 4B, where a Business Transaction of Place Order has been selected by the user. In the UI 350, the dependency graph 401 highlights the nodes and edges which are associated with one or multiple instances of Place Order. The highlighted nodes are: 410, 420, 421, 444, 426 and 432 and the highlighted edges are the arrows between these nodes. Example time metrics are also displayed, such as above or within a corresponding node. That is, the UI and its nodes and edges can be decorated with the metrics. Here, an example aggregate response time is 1200 msec. for TradeService 420 and an example aggregate response time is 200 msec. for the call from TradeService 420 to the backend 421, represented by edge 453. Moreover, alert icons 451 and 452 are associated with nodes 410 and 420, respectively. An alert icon 455 is associated with the edge 453. These metrics may be for a single instance of a Business Transaction such as Place Order or, more commonly, an average over multiple instances of the Business Transaction, such as over a specified time interval.

The edge 453 is thus decorated with at least one of: an aggregate metric "200 msec." and an alert 455 based on the aggregate metric, and the node 420 is a first node which is decorated with at least one of an aggregate metric "1200 msec." and an alert 452 based on the aggregate metric.

Due to the highlighting of nodes and edges, the user can quickly identify the subsystems that are associated with a given Business transaction even when a subsystem is associated with multiple Business Transactions. Further, due to the use of metrics and alerts, the user can quickly ascertain that a given subsystem within a Business Transaction is a problem and focus the diagnosis on that subsystem. The severity of an alert can also guide the user. The metrics which are provided on the UI can be based on data from a managed application in a specified time interval. However, in some cases, even with the alerts and metrics it can be difficult to locate a root cause of the problem. For example, a root cause of the TradeService 420 having a slow response time might actually be due to a problem with the OrderEngine 426 or the OrderRecordsSQL 432, upon which the TradeService 420 depends. In one embodiment, the system automatically locates such a root cause software component.

Figure 5:
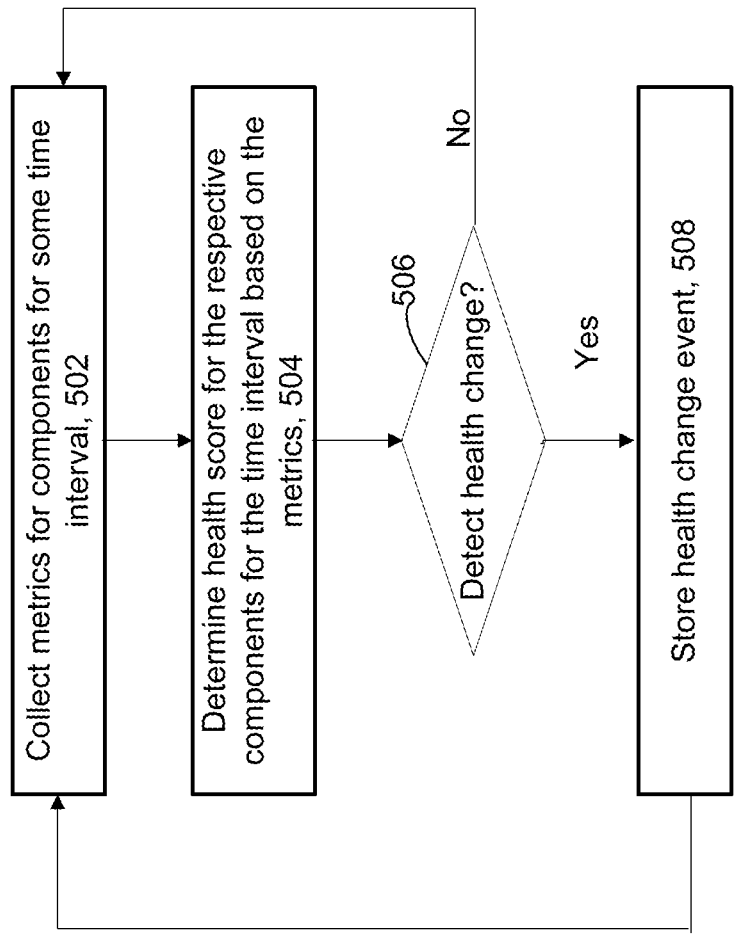
FIG. 5 is a flowchart of one embodiment of a process for recording changes in the health of software components in a computer system.

FIG. 5 is a flowchart of one embodiment of a process 500 for tracking and recording changes in the health of software components in a computer system. The method could be performed in a network 100 such as depicted in FIG. 1. More specifically, the method could be performed by a processor or a computer system. This process may be used to establish a record of health change events. A health change event may occur when the health score of a software component goes from healthy to unhealthy or, alternatively from unhealthy to healthy. A health change event could also occur in response to some anomalous event, such as an exception that occurred during execution of a software component. The record of health change events can be used when finding a software component that is a root cause of a health problem in other software components.

Step 502 includes collecting metrics of the software components. As mentioned herein, as a managed application executes, relevant software component data may be obtained through instrumentation of the application. In one embodiment, the metrics are collected by agents such as Agent A1 108, Agent A2 112, and Agent A3 116. The Agents may send the metrics to the Manager 120. Note that the Agents are not required to run on the same computer system that is being monitored. The data at the Manager 120 can be stored in a database 118 (FIG. 1) such as at a storage device 310 (FIG. 3). In one embodiment, the performance metrics for some time interval are aggregated. Thus, the metrics being referred to in step 502 may be the metrics for some time interval.

In one embodiment, the metrics are collected by instrumenting the application that contains the software components being monitored. However, instrumenting the application is not a requirement to collect the metrics. A wide variety or metrics may be collected. Some metrics may be referred to as "performance metrics." Example metrics include, but are not limited to, an average execution or response time of a software component, an invocation rate per second or per interval, a count of invocations, a concurrency metric indicating a number of invocations that have started but not finished, errors per interval, and a stalled metric indicating a number of invocations that have started whose method invocation times have exceeded a specific threshold. The metrics are not limited to, "performance metrics."

FIGS. 4A-4C show one example of various software components in a computer system for which metrics may be collected. When collecting the data, the system may note dependencies between the various software components. Thus, the system may identify software components which were invoked in the time period and their dependencies. The association of software components to a Business Transaction can be achieved using special map tracers that report back information about transactions that are occurring; if the transaction matches a Business Transaction Component, then that transaction is labeled with that Business Transaction Component name and all the lower-level components invoked during that transaction are associated with that Business Transaction Component (and thus its Business Transaction). Those lower-level components later get aggregated into "subsystems" based on certain rules. Within the transaction trace, the front end and back end-calls that appear in the graph and the tree are associated with specific metric paths (identifiers) that are appear associated with a segment when that component is hit as part of a traced transaction Step 504 includes determining a health score for the respective software components based on the metrics. A separate health score may be determined for each software component. The health score for a given software component may be based on one or more metrics associated with that software component. Note that different types of metrics may be used for different software components.

Figure 8A:
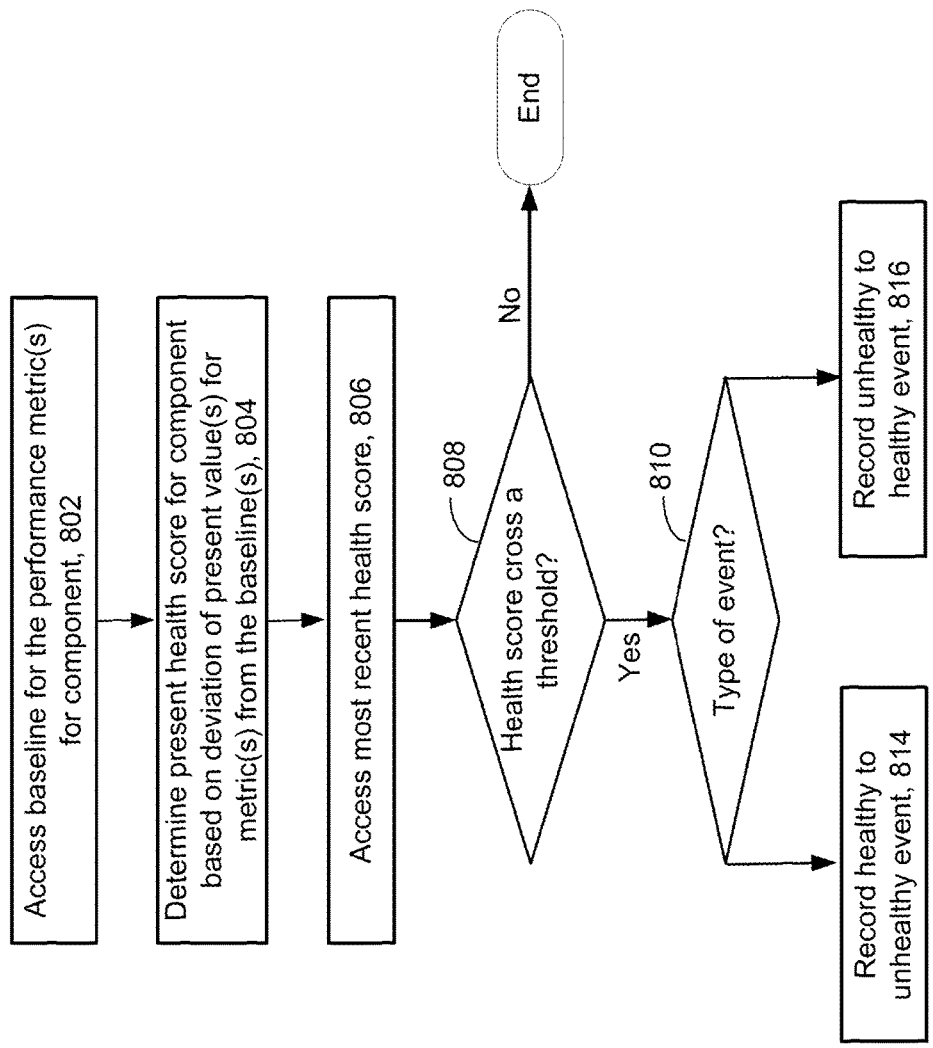
FIG. 8A is a flowchart of one embodiment of a process of recording a set of health change events.

Step 506 includes detecting whether there is a change in the health status of any of the software components. In one embodiment, the change is whether the health status went from healthy to unhealthy or, alternatively, from unhealthy to healthy. Note that this change may be for the health status from one time interval to the next time interval (such as, but not limited to, the time interval mentioned in step 502). FIG. 8A shows details of one embodiment of detecting health change events.

Step 506 may also factor in information other than the health score. In one embodiment, step 506 includes detecting whether there is an anomalous event with respect to execution of one of the software component. Such an anomalous event may indicate unhealthy status. For example, if a software component throws an exception, this can indicate an unhealthy status regardless of the health score at that time. Note that a software component may be assigned the unhealthy status even if the health score that was determined independent of the anomalous event indicates healthy status. In one embodiment, the health score is modified in response to the occurrence of an anomalous event. For example, the present health score can be modified to a score that indicates unhealthy status. Thus, referring back to step 504, the health score for the time interval is further based on whether an anomalous event occurred. Note that when an anomalous event occurs during some time interval, the unhealthy status might be carried forward to future time intervals. For example, if a software component throws an exception during a given time interval then the software component could be considered unhealthy for that time interval and future time intervals.

Step 508 includes storing data that indicates the change in health status. This data may be recorded as a "health change event." The health change event data may include the time of the event, as well as some information that either directly specifies the change or from which the change can be inferred. For example, the system could simply store the health score (which may be based in part on whether an anomalous event occurred), the software component involved, and the time of the event. So long as this list of events only includes health change events, it can be inferred that the health of the software component changed at this time. Thus, so long as the system knows that at some point in the past, the software component was healthy, the system can determine the present health by noting how many health change events occurred. Alternatively, the event could list a type of event. For example, a type 1 event can mean a health change from healthy to unhealthy, and a type 2 event can mean a change from unhealthy to healthy.

Note that the health change events can be stored efficiently. For example, a relatively small amount of data can record all of the health change events. In one embodiment, steps 504-508 are performed in real time, as the metrics are being collected. However, steps 504-508 could be performed at any time. For example, metrics could be collected in real time and stored in step 502. At some later point in time, the stored metrics could be analyzed to determine health scores in step 504. Also, the time at which anomalous events occurred could be optionally be stored. However, another option is to simply modify the health score to indicate the occurrence of an anomalous event. Then, steps 506-508 can be performed.

FIG. 6 is a flowchart of one embodiment of a process 600 of finding a software component that is a root cause of health problems in other software components in a computer system. This process may be performed by a processor, a computing system, etc. For the sake of discussion, the process will be described from the perspective of a system performing the various steps. In one embodiment, this process is performed in conjunction with the process of FIG. 5. FIGS. 7A-7H are diagrams of one embodiment of a user interface display that shows a dependency map. For the sake of discussion, FIGS. 7A-7H will be referred to when discussing process 600. Briefly FIGS. 7A-7H show a user interface display 350 showing a dependency map 401. Also depicted is an event-line 770. In this example, there are seven events (e1-e7), which correspond to seven health change events.

In step 602, the system determines that a software component has an unhealthy status at a certain point in time. The particular software component will be referred to as a "problem component." This determination may be made based on the health scores that are determined in step 504 of FIG. 5. This determination may be made based on an anomalous event that indicate that a certain software component is unhealthy. As noted above, the health scores can factor in metrics as well as anomalous events. Referring to FIG. 7A, as one example, the system determines that the balances component 406 is presently unhealthy. This step may have been triggered by an alert, but that is not a requirement. Note that an open circle in the left side of a software component is used to represent a healthy state and a filled circle is used to represent an unhealthy state.

In step 604, the system accesses the health of various software components for the certain point in time. For example, the system accesses the present health scores that were determined in step 504 of FIG. 5. Recall that the present health score may be based on one or more metrics associated with a software component for recent time interval. In one embodiment, the present health score is also based on whether an anomaly has occurred during some time interval. This is not necessarily the same time interval as the one for which the metrics were collected. From these health scores, the system can determine whether each software component has a status of healthy or unhealthy. Referring to FIG. 7A, the system might determine the health of all of the software components in that diagram. Note that the health scores can reveal more than two states (healthy, unhealthy). Thus, in one embodiment, the system can determine three or more health states for each software component. FIG. 8B and its associated description below provides further details of the system determining three or more health states for a software component.

In step 606, the system analyzes the pattern of health and unhealthy software components to determine whether this is a recurring pattern. For example, referring to FIG. 7A, the system notes that the following software components are unhealthy at that time: Login 404, Balances 406, AuthenticationService 422, ReportingService 424, Web Service 846, AuthenticationEngine 428, ReportingEngine 430, and CustRecordsSQL 436. The rest of the software components are healthy. It may be that from time to time this pattern of healthy/unhealthy software components is seen. If so, the system can save some time and perhaps perform a more accurate analysis by looking to a historical record. Thus, if the pattern is recognized (step 606=yes), the process continues at step 608 where the system determines whether there is a known cause for this pattern. If so (step 608=yes), then the triage is performed at step 610. If the cause is not known (step 608=no), then the process goes to step 612. Likewise, if the pattern is not a recurring one (step 606=no), then the process goes to step 612.

As noted above, a software component could have three or more health states. For example, these states might be healthy, warning, and unhealthy. This provides more information upon which to do the pattern matching in step 606. Thus, for example, the TradeService 420 might be in the warning state. Therefore, for a match, the TradeService 420 should have the warning state in the recurring pattern.

Note that if the system were just interested in determining health/unhealthy, then the warning state could be considered a healthy state. Alternatively, the warning state could be considered an unhealthy state. Thus, the three or more states could be collapsed to two states, depending on the analysis to be performed.

Step 612 includes determining a set of software components that are linked by dependencies to the problem software component from step 602. Referring to FIG. 7A, the system might note that Balances 406 depends on ReportingService 424, Web Service 845, ReportingEngine 430, ReportRecordsSQL 438, AuthenticationEngine 428, and CustRecords 436.

Figure 7B:
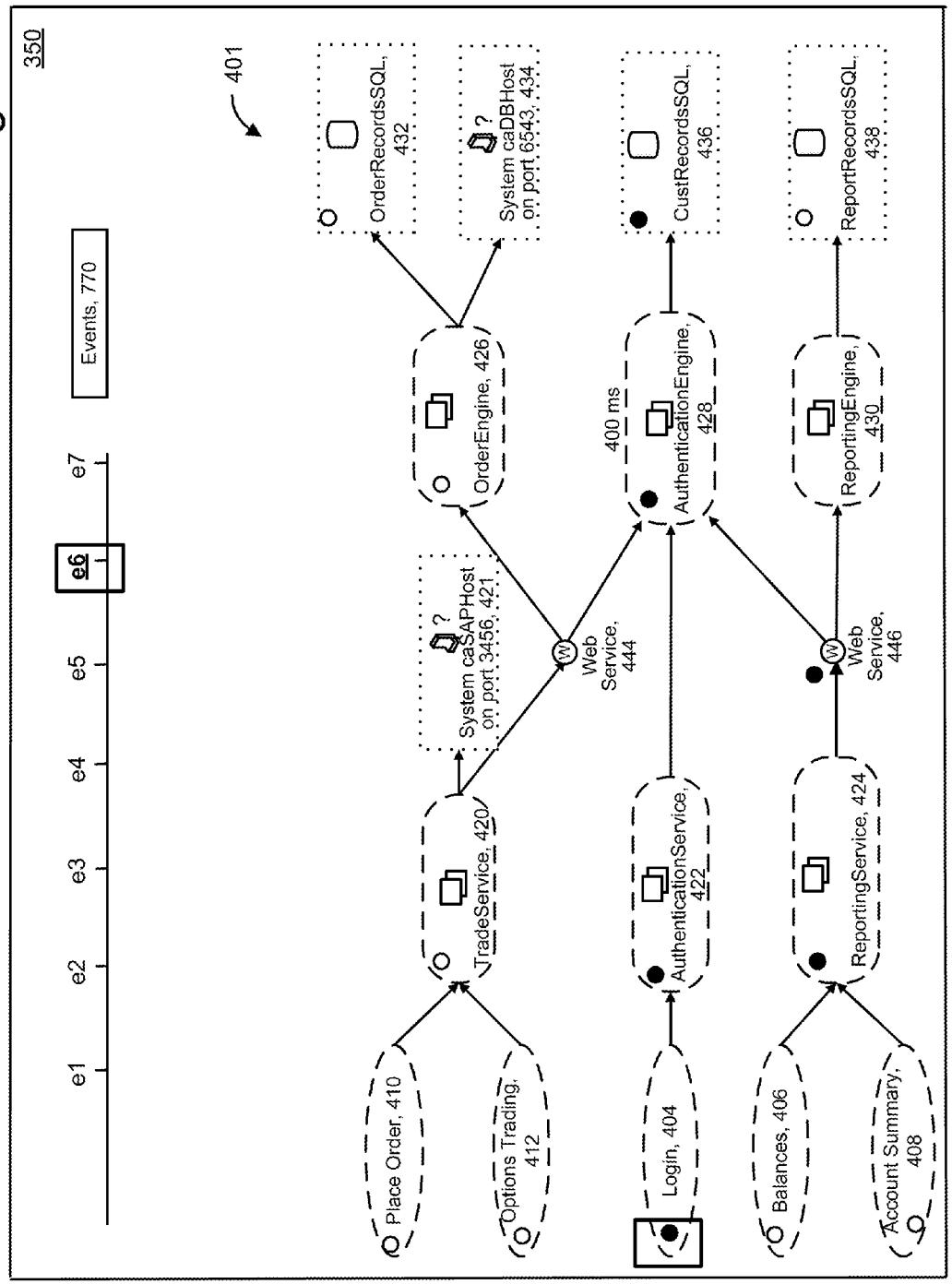

Step 614 includes the system rolling back to the previous health change event. As one example, the system rolls back from event e7 to event e6. The state of the software components at event e6 is represented in FIG. 7B, which highlights that the Login component 404 went from healthy to unhealthy at event e6. This is highlighted by the box surrounding the health status indicator. Rolling back to the previous health change event has the effect of determining a previous state of the software components at which point the health score for a software component went from the healthy status to the unhealthy status. Note that FIGS. 7A-7H are shown to help illustrate how the system can automatically roll back through the health change events. However, when the system is automatically rolling back through the health change events it does not need to display the dependency maps 401 on the user interface 350.

In step 616, the system determines whether all of the software components in the set with the dependencies are healthy at the time of the event change of step 614. In the present example, the system will determine this is not the case, in which case the process 600 returns to step 614 to roll back to the previous event. Moving sequentially through FIGS. 7C-7H, the system determines that at event e5 that the ReportingServce 424 went from healthy to unhealthy (see FIG. 7C). Note that Balances 406 depends from ReportingServce 424. Also note that at this time, Balances 406 is healthy. Thus, it may be that the poor health of the ReportingServce 424 was a cause of the later poor health of Balances 406 (at e7). However, this does not mean that the ReportingServce 424 is the root cause of the health problem of Balances 406.

Figure 7D:
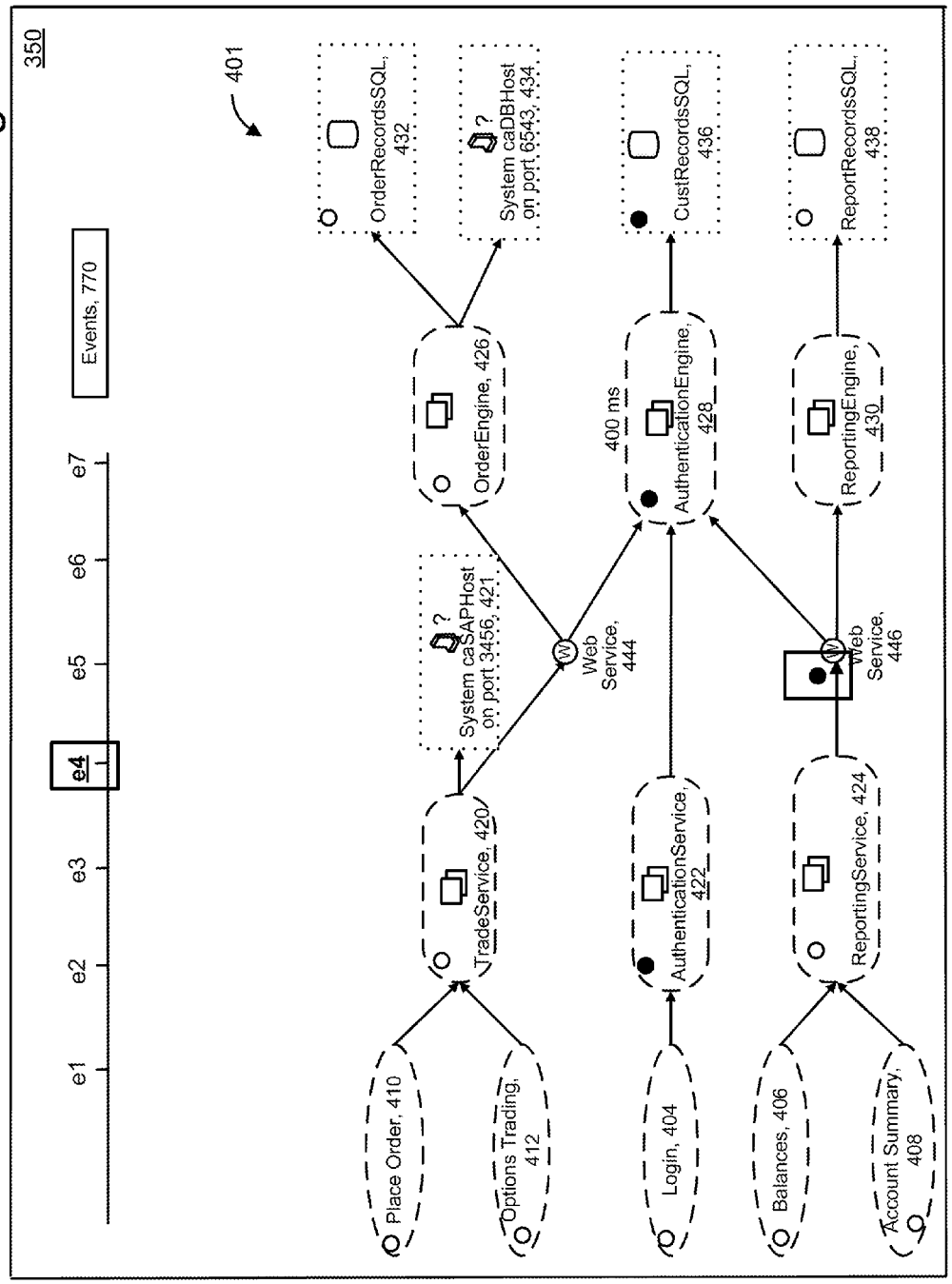
Figure 7E:
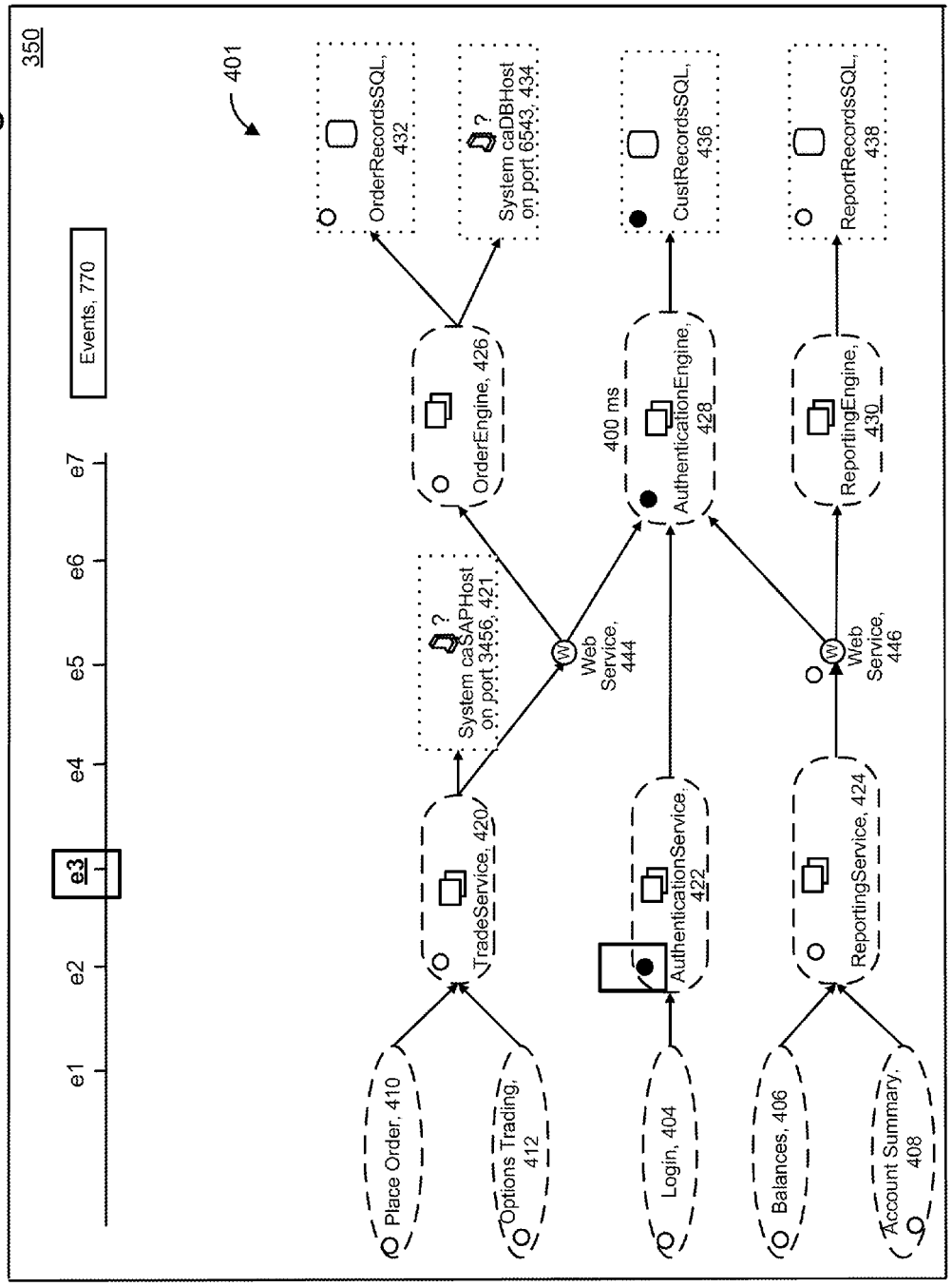
Figure 7F:
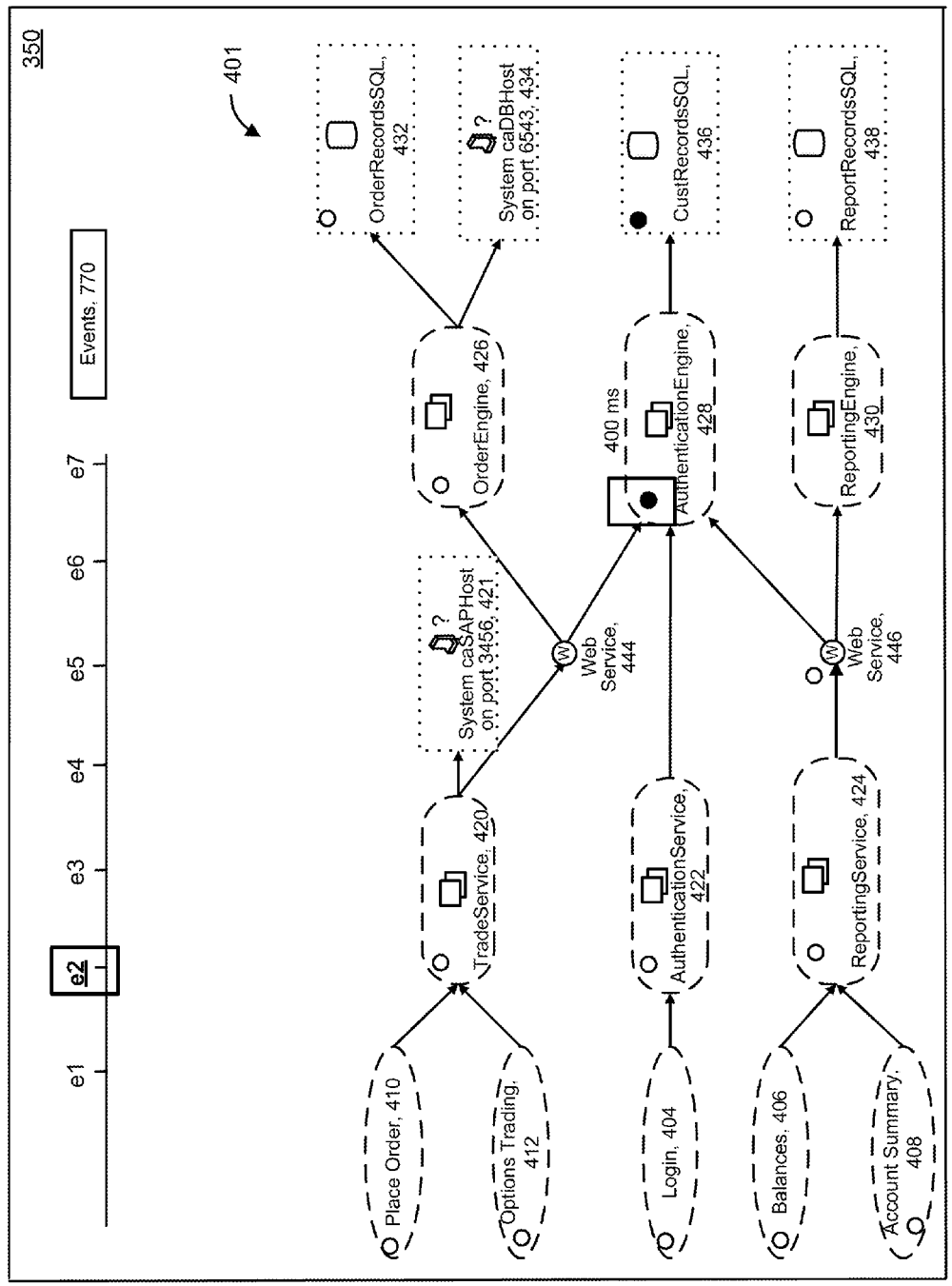
Figure 7H:
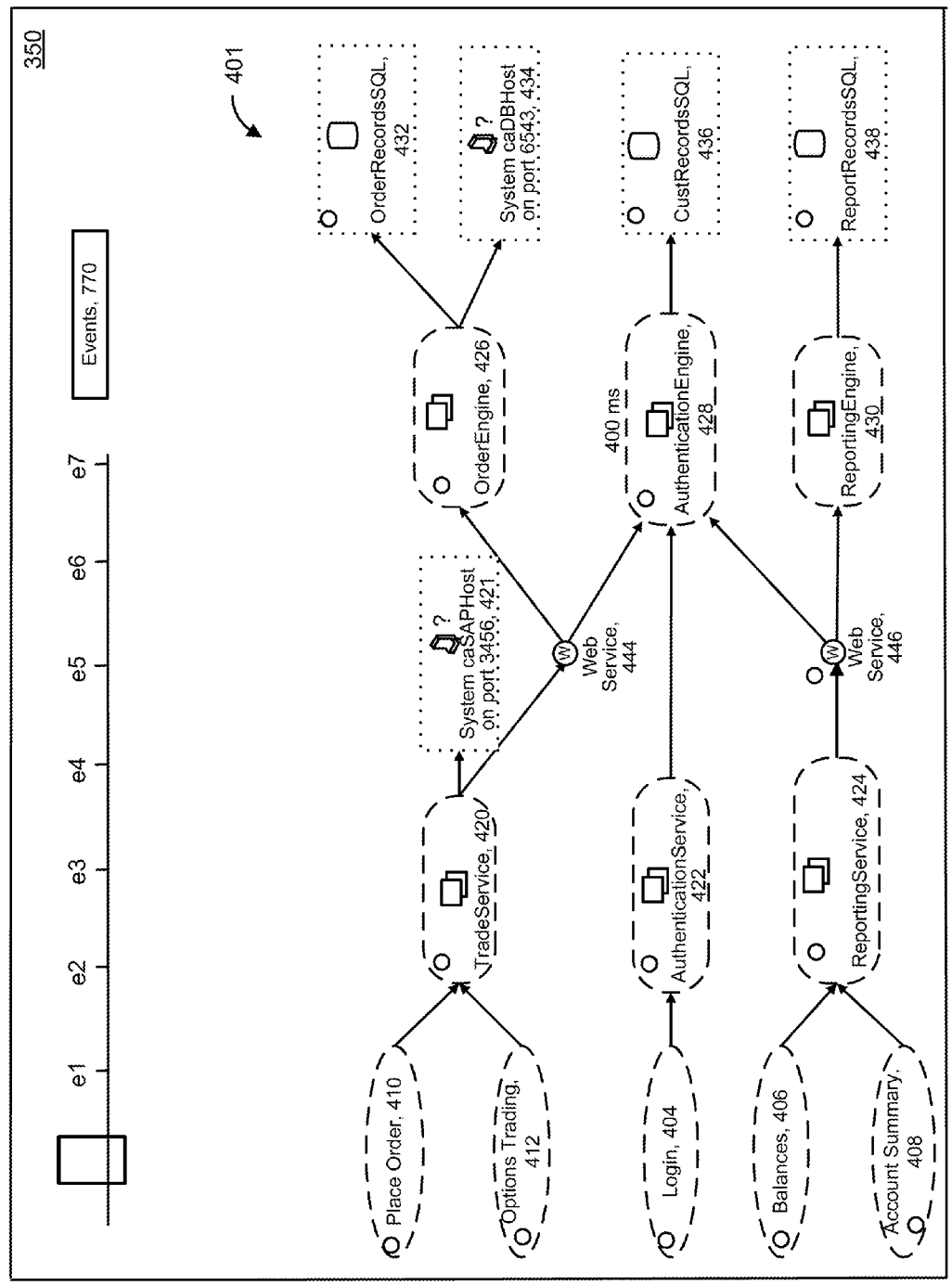

Referring to FIG. 7D, the system determines that the Web Service 446 went from healthy to unhealthy at event e4. Referring to FIG. 7E, the system determines that the AuthenticationServce 422 went from healthy to unhealthy at event e3. Referring to FIG. 7F, the system determines that the AuthenticationEngine 428 went from healthy to unhealthy at event e2. Referring to FIG. 7G, the system determines that the CustRecordsSQL 436 went from healthy to unhealthy at event e1. Referring to FIG. 7H, the system determines that the all of the software components in the set were healthy prior to event e1. Thus, at this point the process continues at step 618.

At step 618, the system identifies the first software component in the set that became unhealthy as patient zero. That is, the system identifies the first software component in the set that became unhealthy as a root cause of a health problem in other software components in the set. In the present example, the system determines that CustRecordsSQL 436 was the first software component in the set that have the dependency relationship with the Balances component 406 to become unhealthy. Thus, CustRecordsSQL 436 is determined to be a root cause of the health problem of Balances 406. Note that CustRecordsSQL 436 may also be determined to be a root cause of the unhealthy status of other software components in the set.

The process 600 then goes to step 610, in which triage is performed. Since, CustRecordsSQL 436 was determined to be a root cause, triage can focus on solving the health problem with CustRecordsSQL 436. Solving the health problem with CustRecordsSQL 436 may solve the health problem of the other software components in the set.

FIG. 8A is a flowchart of one embodiment of a process 800 of recording a set of health change events. This process may be performed by a processor, a computing system, etc. For the sake of discussion, process 800 will be described from the perspective of a system performing the various steps. In one embodiment, this process is performed in conjunction with the process of FIG. 5. The process 800 can be performed when the metrics are being collected. The process can be performed every so often, such as every few milliseconds, or some other interval. Process 800 refers to one software component. The process can be performed for as many software components as desired each interval.

In step 802, a baseline value is accessed for a performance metric. The baseline value for the performance metric may be time series data. For example, a performance metric such as response time for a software component may be determined every few milliseconds, or some other interval. This performance metric may be an aggregation of collected metrics for the software component. Step 802 can access baseline values for more than one metric for the software component.

In step 804, the system determines a present health score for the software component based on a deviation of the present value(s) for the metric(s) and the baseline value(s). FIG. 8B will be referred to as an illustration. FIG. 8B shows a time series of prior data points for some metric to illustrate one embodiment of health scores. Note that the vertical axis represents the value of the metric and the horizontal axis represents time. Based on the time series, a predicted data point for the present value is shown on the timeline. In this example, three health ranges are depicted, but there can be more or fewer than three health ranges. The health ranges are based on how far the present value deviates from the predicted value (or an "expected" value). Note that an alternative is to predict a range of values for the performance metric (or "expected range").

A low level of deviation from the predicted value is associated with a health range 833, in the example of FIG. 8B. A medium level of deviation is associated with health range 836. A high level of deviation is associated with health range 834. In this example, the software component can be assigned one of three health scores based on the range. As noted, there could be many more ranges. In general, there should be at least two ranges. In one embodiment, one set of ranges is associated with a healthy status and another set of ranges is associated with an unhealthy status. For example, if the deviation is either low or medium, the status could be deemed healthy. Thus, if the deviation high, the status could be unhealthy. As an alternative, only if the deviation is low medium, should the status be deemed healthy. In this example, if the deviation is medium or high, the status should be deemed unhealthy.

Step 806 includes accessing the most recent health score for the software component. As one example, the system determines which health range the software component is in. Step 808 includes determining whether the health score crossed a threshold. The threshold could be based on user supplied data or the system could determine the threshold. Note that the threshold can be dynamic. For example, the threshold could change depending on the time of day, day of week, etc. In other words, the system determines whether the health score went from healthy status to unhealthy status or vice versa. If not, then the process concludes. The process can be performed again whenever desired.

If the health status has changed (step 808 is yes), then control passes to step 810 to determine the type of event. In one embodiment, there are two types of events that may be recorded. Step 814 is to record an event that the health status went from healthy to unhealthy. In the example of FIG. 8B, health ranges 833 and 836 may both indicate a healthy software component, with health range 834 being unhealthy. Thus, step 814 may be performed in response to the health score going from either range 833 or 836 to range 834.

Step 818 is to record an event that the health status went from unhealthy to healthy. Using the example of FIG. 8B, step 814 may be performed in response to the health score going from range 834 to either range 833 or 836. The process 800 then concludes for this software component for this time interval.

Returning again to the discussion of FIG. 6, recall that step 606 was to determine whether the health pattern is recurring. In one embodiment, the health pattern makes use of health ranges other than just healthy and unhealthy. For example, the health pattern may be based on the three ranges in FIG. 8B. For the sake of discussion, the three ranges may be referred to as good (corresponding to range 833), warning (corresponding to range 836) and alert (corresponding to range 834). Thus, the system may determine whether the good, warning, and alert pattern has occurred previously. The health pattern matching could make use of additional ranges.

Figure 9:
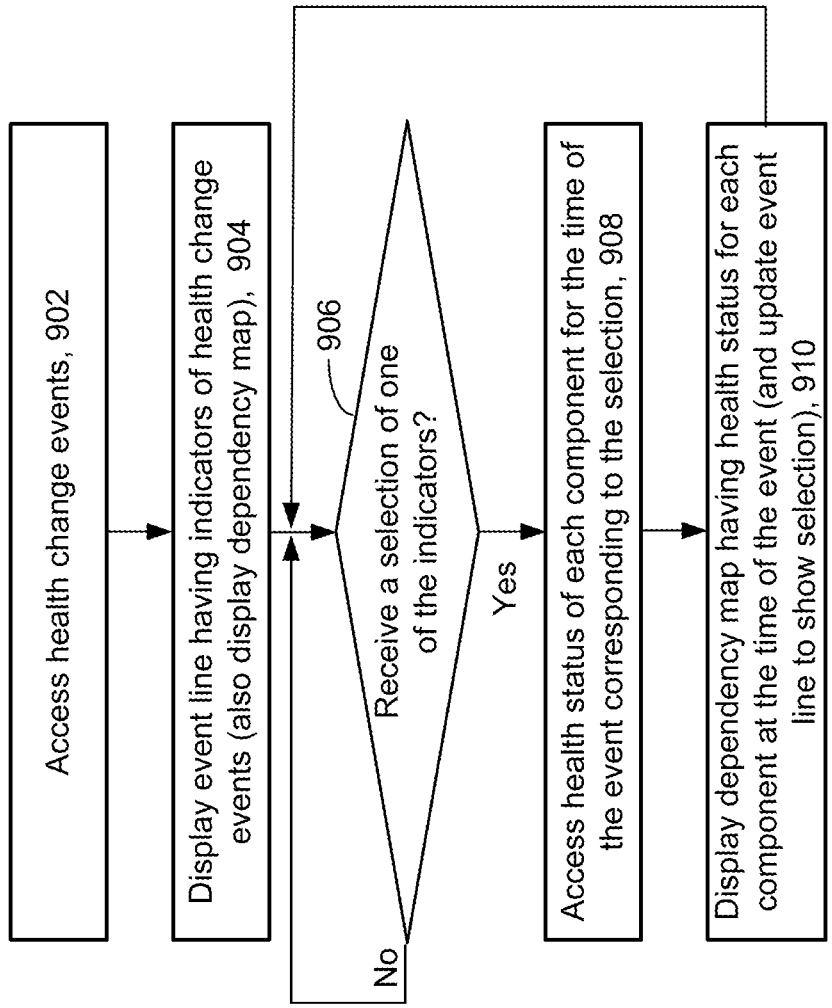
FIG. 9 is a flowchart of one embodiment of a process of displaying a dependency map showing health status of software components corresponding to health event changes.

FIG. 9 is a flowchart of one embodiment of a process 900 of displaying a dependency map showing health status of software components corresponding to health event changes. This can help a user to visualize how a health problem is spreading through the software components.

Step 902 includes accessing health change events. This may include accessing health change events that were stored at either step 508 of process 500 or steps 814 or 816 of process 800.

Step 904 includes displaying a timeline having indicators of health change events. Step 904 may include the system displaying the timeline in a user interface display 350 coupled to the system. FIGS. 7A-7H show examples in which an event-line 770 is depicted in a user interface display 350. In this example, there are seven health change events e1-e7. Each event could pertain to one of the software components changing from healthy to unhealthy or to one of the software components changing from unhealthy to healthy.

Step 906 includes the system receiving a selection of one of the event indicators (e1-e7) in the user interface display 350. For example, referring to FIG. 7C, the system receiving a selection of event indicator e5 in the user interface display 350.

Step 908 includes the system accessing a health status of each software component for the time of the event corresponding to the selection. This may be accessed from the health event changes that were stored in step 508.

Step 910 includes displaying a dependency map having a health status for each software component at the time of the selected health change event. In other words, the dependency map shows the health status for the state of the software components that is associated with the selected health change event. Referring to the example in FIG. 7C, software components that were unhealthy at the time of event e5 are depicted with a filled circle. Alternatively, software components that were healthy at the time of event e5 are depicted with an open circle.

Step 910 may also include highlighting the software component that had a health change event for the selected event. In this example, ReportingService 424 is highlighted to indicate that it had the health change event. The user is able to infer that its status went from healthy to unhealthy at event e5. The user is further able to note the dependency relationships between ReportingService 424 and other software components, as well as their respective health status. Moreover, the user is able to move through the events in the event-line 770 to visually see how the health problem has spread through the software components.

Figure 10:
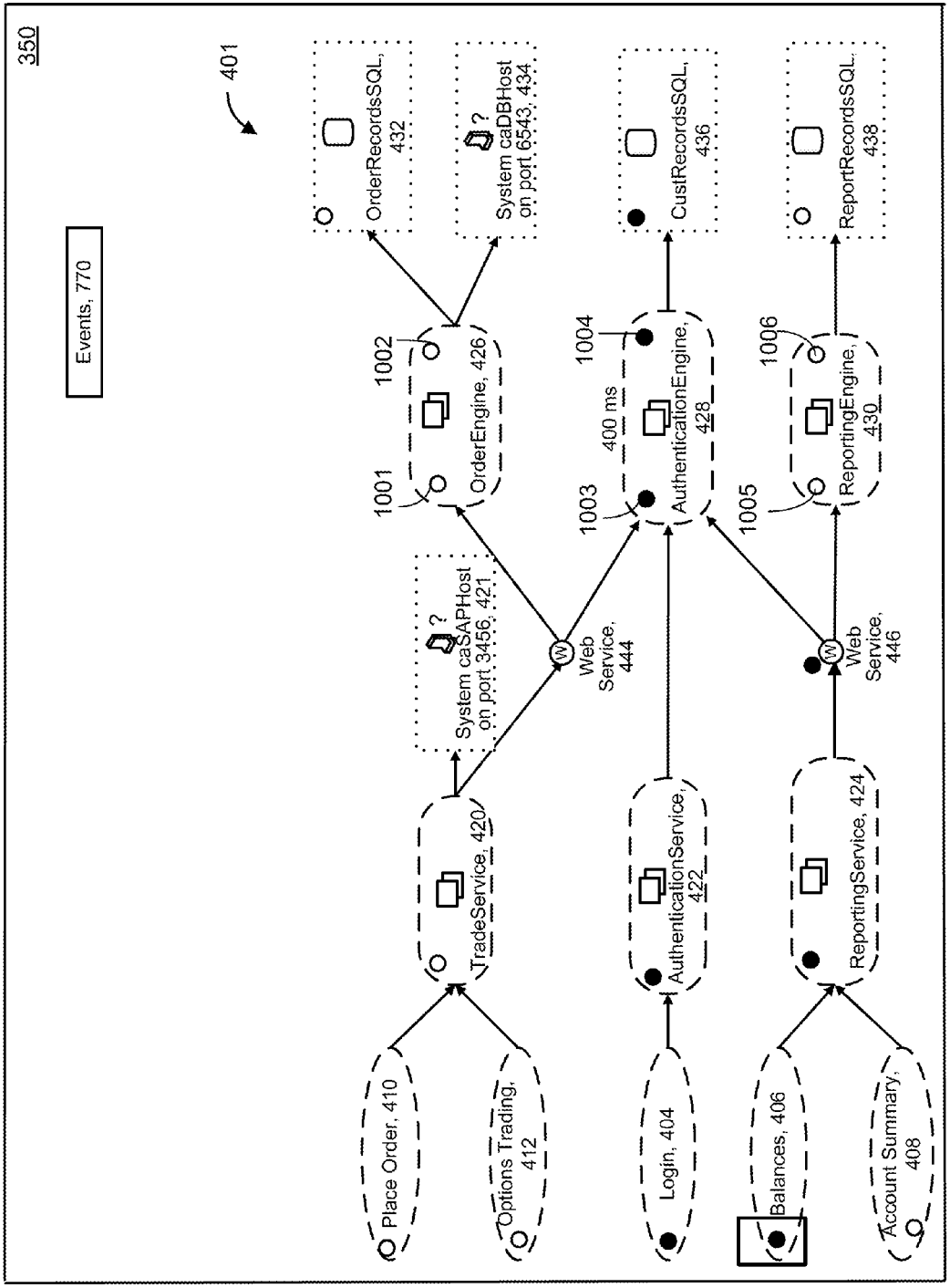
FIG. 10 is a diagram of another embodiment of a user interface display that shows a dependency map.

Referring back to FIGS. 7A-7H note that the various software components can execute on any number of computer systems. Also note that when determining the health of a software component, there is great flexibility in determining the scope of the software component. For example, referring to FIGS. 7A-7H, the health of OrderEngine, 426 is determined in one embodiment. Thus, OrderEngine is one example of a "software component." In another embodiment, the granularity can be finer. FIG. 10 show a diagram in which OrderEngine 426 has two health status indicators 1001, 1002, AuthenticationEngine 428 has two health status indicators 1003, 1004, and ReportingEngine 430 two health status indicators 1005, 1006. Health status indicators 1001, 1003, 1005 may be referred to as front end health status indicators. Health status indicators 1002, 1004, and 1006 may be referred to as back end health status indicators. Each health status indicators may be for a software component. Thus, OrderEngine 426, in one embodiment, has a front end software component and a back end software component. Likewise, AuthenticationEngine 428, in one embodiment, has a front end software component and a back end software component. Likewise, ReportingEngine 430, in one embodiment, has a front end software component and a back end software component. The example of "front end" and "back end" are illustrative and can be expanded to other levels of granularity. Note that by determining the health status on this finer level of granularity, additional information is learned. For example, a problem with OrderEngine 426 might be more due to a bad health status of the back end (as indicated by indicator 1002) than to the health status of OrderRecordsSQI 432.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method comprising:
    tracing transactions performed by a plurality of software components that execute on a computing system;
    collecting, by the computing system, performance metrics for each of a plurality of time periods from tracing the transactions;
    determining, by the computing system, a health status for each of the plurality of software components for each of the plurality of time periods, wherein the health status is either a healthy status or an unhealthy status, wherein the health status of a given software component for each time period is based on a deviation between a value of a first of the performance metrics for that time period and a baseline value for the first performance metric for the software component;
    storing, by the computing system, health change events, wherein each health change event corresponds to one of the software components of the plurality of software components changing between the healthy status and the unhealthy status from one time period to the next time period, including storing data that indicates a time for ones of the health change events into computer readable storage;
    determining, by the computing system, a problem software component in the plurality of software components with the unhealthy status at a certain point in time;
    determining, by the computing system, a set of software components in the plurality of software components from which the problem software component depends when processing one of the transactions, wherein multiple software components in the set of software components have the unhealthy status at the certain point in time;
    rolling back in time, by the computing system, through the stored data for the health change events to determine a root cause of the problem software component having the unhealthy status at the certain point in time, wherein rolling back in time comprises automatically going back in time through the health change events to each previous health change event until a point in time at which all of the software components in the set have the healthy status, wherein rolling back to the previous health change event determines a previous state of the set of software components at which point the health score for a given software component went from the healthy status to the unhealthy status; and identifying, by the computing system, a software component in the set of software components that was first in time to have its health status go from the healthy status to the unhealthy status after the point in time at which all of the software components in the set had the healthy status as the root cause of the problem software component having the unhealthy status at the certain point in time.

2. The method of claim 1, further comprising the computing system:

displaying a dependency map for a selected state of the set of software components on a user interface display coupled to the computing system, wherein the dependency map shows dependencies between the set of software components, wherein the dependency map further shows whether each software component in the set of software components has the healthy status or the unhealthy status at the selected state.

3. The method of claim 1, further comprising:

displaying, on a user interface display coupled to the computing system, an event-line that comprises an indicator for each of the plurality of events;

receiving, at the computing system, a selection of the indicator for one of the plurality of health change events; and displaying, on the user interface display, a dependency map that comprises the set of software components in response to receiving a selection of the indicator, wherein the dependency map shows dependencies between the set of software components, wherein the dependency map further shows whether each software component in the set of software components has the healthy status or the unhealthy status at the health change event that corresponds to the selected indicator.

4. The method of claim 1, wherein the determining, by a computing system, a health status for each of a plurality of software components for each of the plurality of time periods comprises:

determining, by the computing system, a health score for each of the plurality of software components for each of the plurality of time periods, wherein the health score for a given software component for each respective time period is based on one or more of the performance metrics for the given software component for the respective time period, wherein a health score at or above a threshold score indicates the healthy status and a health score below the threshold score indicates the unhealthy status.

5. The method of claim 1, wherein the determining, by a computing system, a health status for each of a plurality of software components for each of a plurality of time periods further comprises:

detecting a health change event that indicates an anomaly with respect to a particular software component; and determining that the health status of the particular software component is the unhealthy status in response to detecting the health change event.

6. The method of claim 1, wherein:

determining a health status for each respective software component of the plurality of software components comprises:

i) determining a health score for the respective software component for a certain time period based on values for the performance metrics for the respective software component for the certain time period;

ii) accessing a health score for the respective software component for a previous time period to the certain time period; and iii) determining whether a change from the health score for the previous time period to the health score for the certain time period indicates a change between the healthy status and the unhealthy status for the respective software component; and storing data that indicates a time for ones of the health change events into computer readable storage comprises:

i) recording a first health change event that indicates that the health score for the respective software component went from the healthy status to the unhealthy status during the certain time period in response a determination that the change in health score so indicated; and ii) recording a second health change event that indicates that the health score for the respective software component went from the unhealthy status to the healthy status during the certain time period in response a determination that the change in health score so indicated.

7. The method of claim 1, further comprising:

determining, by the computing system, dependencies between the plurality of software components as the plurality of software components process the transactions.

8. The method of claim 1, further comprising:

analyzing, by the computing system, a pattern of healthy and unhealthy software components among the plurality of software components at some point in time to determine whether the pattern has occurred before; and responsive to a determination that the pattern has occurred before, determining by the computing system whether there is a known cause for the pattern.

9. The method of claim 8, further comprising:

responsive to a known cause for the pattern being determined, proceeding to triage based on the known cause.

10. The method of claim 1, wherein the software component that was first in time to have its health status go from the healthy status to the unhealthy status is other than the last software component in a chain of software components from which the problem software component depends.

11. An apparatus, comprising:

a storage device; and a processor in communication with the storage device, wherein the processor:

traces transactions performed by a plurality of software components that execute in a computing system;

collects performance metrics for each of a plurality of time periods based on tracing the transactions;

determines a health score for each of the plurality of software components for each of the plurality of time periods based on the performance metrics;

determines a health status for each of a plurality of software components for each of the plurality of time periods, wherein the health status comprises either a healthy status or an unhealthy status based on whether the health score for the software component is above or below a threshold;

determines health change events, wherein each health change event corresponds to one of the software components of the plurality of software components changing between the healthy status and the unhealthy status from one time period to the next time period, including stores data into the storage device that indicates a time for ones of the health change events;

determines a problem software component of the plurality of software components with the unhealthy status at a certain point in time;

determines a set of software components of the plurality of software components from which the problem software component depends at the certain point in time, wherein multiple software components in the set of software components have the unhealthy status at the certain point in time;

rolls back in time through the data that indicates a time for ones of the health change events for the plurality of software components to determine a root cause of the problem software component having the unhealthy status at the certain point in time, wherein the processor automatically goes back in time through the health change events to the previous health change event until the health change events indicate all of the software components in the set have the healthy status, wherein the processor determines a previous state of the software components at which point the health score for a given software component went from the healthy status to the unhealthy status; and identifies the software component in the set that was the first in time to go from the healthy status to the unhealthy status as the root cause of the problem software component having the unhealthy status.

12. The apparatus of claim 11, wherein the processor further:
displays a dependency map on a user interface display coupled to the processor, wherein the dependency map shows dependencies between the set of software components, wherein the dependency map further shows whether each software component in the set of software components has the healthy status or the unhealthy status at a point in time.

13. The apparatus of claim 11, wherein the processor further:
displays, on a user interface display coupled to the processor, an event-line that comprises an indicator for each health change event of the plurality of health change events;
receives a selection of the indicator for a first health change event of the plurality of health change events; and
displays, on the user interface display, a dependency map that comprises the set of software components in response to receiving the selection the indicator, wherein the dependency map shows dependencies between the set of software components, wherein the dependency map further shows whether each software component in the set of software components has the healthy status or the unhealthy status at the health change event that corresponds to the indicator.

14. The apparatus of claim 11, wherein the processor determines the health status for a particular software component based on a health score for the particular software component, wherein the processor determines the health score for the particular software component for each of the respective time periods based on a metric for the particular software component for the respective time periods, wherein a health score at or above a threshold score indicates a healthy status and a health score below the threshold score indicates an unhealthy status.

15. The apparatus of claim 14, wherein the processor further determines the health status for the particular software component based on a health change event that indicates an anomaly with respect to the particular software component, wherein the processor sets the health status for the particular software component to the unhealthy status in response to detecting the health change event that indicates an anomaly.

16. The apparatus of claim 14, wherein the health score of the particular software component for a specified time is based on a deviation between a value of a performance metric for the particular software component at the specified time and a baseline value for the performance metric for the particular software component.

17. The apparatus of claim 14 wherein, when the processor determines the health score for the particular software component, the processor:
accesses a baseline for a performance metric of the particular software component; and
determines that a value for the performance metric of the particular software component at a specified time was outside of an expected range for the performance metric given the baseline.

18. The apparatus of claim 17, wherein the processor further performs the following for each respective software component of the plurality of software components:
determines a specified health score for the respective software component for a specified time based on values for the performance metrics for the respective software component at the specified time;
accesses a previous health score for the respective software component, wherein the previous health score is for a time period just prior to the specified time;
determines whether a change from the previous health score to the specified health score indicates a change between healthy status and unhealthy status for the respective software component;
records a first health change event that indicates that the health score for the respective software component went from the healthy status to the unhealthy status at the specified time in response a determination that the change in health score so indicated; and
records a second health change event that indicates that the health score for the respective software component went from the unhealthy status to the healthy status at the specified time in response a determination that the change in health score so indicated.

19. A computer program product, comprising:
a non-transitory computer readable storage medium having computer readable program code embodied therewith, the computer readable program code comprising:
computer readable program code configured to trace transactions performed by a plurality of software components that execute in a computing system;
computer readable program code configured to collect performance metrics for each of a plurality of time periods from tracing the transactions;
computer readable program code configured to determine a health score for each of the plurality of software components based on one or more of the performance metrics for the respective software component for each of the plurality of time periods, wherein a health score at or above a threshold score indicates a healthy status and a health score below the threshold score indicates an unhealthy status;

computer readable program code configured to store health change events, each health change event corresponding to one of the software components of the plurality of software components changing between the healthy status and the unhealthy status from one time period to the next time period, including computer readable program code configured to store data that indicates a time for ones of the health change events into computer readable storage;

computer readable program code configured to determine a problem software component of the plurality of software components whose health score indicates the unhealthy status at a specified point in time;

computer readable program code configured to determine a set of software components of the plurality of software components from which the problem software component depends at the specified point in time, wherein multiple software components in the set of software components have health scores that indicate the unhealthy status at the specified point in time;

computer readable program code configured to roll back in time through the stored data to determine a root cause of the problem software component having the unhealthy status at specified point in time, including computer readable program code configured to automatically go back in time through the health change events for the set of software components to the previous health change event until the health change events indicate all of the software components in the set have the healthy status, wherein the computer readable program code is configured to determine a previous state of the software components at which point the health score for a given software component went from the healthy status to the unhealthy status; and computer readable program code configured to identify a software component in the set of software components that was first in time to have its health status go from the healthy status to the unhealthy status after all of the software components in the set have the healthy status as the root cause of the problem software component having the unhealthy status at the specified point in time.

\* \* \* \* \*